(12) United States Patent
Burns et al.

(10) Patent No.: US 7,542,940 B2
(45) Date of Patent: Jun. 2, 2009

(54) SYSTEM AND METHOD FOR ESTIMATING A SPREAD VALUE

(75) Inventors: Michael J. Burns, Chicago, IL (US); John Harris, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

(21) Appl. No.: 11/417,870

(22) Filed: May 3, 2006

(65) Prior Publication Data

US 2006/0259409 A1 Nov. 16, 2006

Related U.S. Application Data

(63) Continuation of application No. 10/804,631, filed on Mar. 19, 2004, which is a continuation-in-part of application No. 10/137,979, filed on May 3, 2002.

(60) Provisional application No. 60/361,958, filed on Mar. 5, 2002.

(51) Int. Cl.
*G06Q 40/00* (2006.01)
(52) U.S. Cl. .............. 705/37; 35/36; 35/38; 345/258; 345/440
(58) Field of Classification Search ............. 705/35–38; 345/158, 440
See application file for complete search history.

(56) References Cited

U.S. PATENT DOCUMENTS

| 4,588,192 A | 5/1986 | Laborde |
| 4,674,044 A | 6/1987 | Kalmus |
| 4,750,135 A | 6/1988 | Boilen |
| 4,903,201 A | 2/1990 | Wagner |
| 5,038,284 A | 8/1991 | Kramer |
| 5,077,665 A | 12/1991 | Silverman |

(Continued)

FOREIGN PATENT DOCUMENTS

EP 1067471 A1 1/2001

(Continued)

OTHER PUBLICATIONS

Clark et al, Dec. 1992 "Seasonalities in NYSE Bid-Ask Spreads and Stock Returns in January"; The Journal of Finance, vol. 47, No. 5. (Dec. 1992), pp. 1999-2014.*

(Continued)

*Primary Examiner*—Harish T. Dass
(74) *Attorney, Agent, or Firm*—McDonnell Boehnen Hulbert & Berghoff LLP

(57) ABSTRACT

An estimated spread value is computed that represents a price at which a trader might have been able to buy or sell a spread given the current market conditions of the legs. In particular, when an event occurs in one of the legs, price information is gathered from each of the other legs based on the spread definition, in addition to the defined event, and is used in estimating the value of a spread. According to one feature, the computations may be triggered by any predefined event. According to another feature, the computation may be programmed by a user to tailor the estimation process according to the type of spread being traded. The estimated spread value may be used to analyze spreads, it may be fed to other trading related software tools, or it may be used in charting.

16 Claims, 17 Drawing Sheets

U.S. PATENT DOCUMENTS

| | | | |
|---|---|---|---|
| 5,101,353 | A | 3/1992 | Lupien |
| 5,136,501 | A | 8/1992 | Silverman |
| 5,270,922 | A | 12/1993 | Higgins |
| 5,297,031 | A | 3/1994 | Gutterman |
| 5,297,032 | A | 3/1994 | Trojan |
| 5,689,651 | A | 11/1997 | Lozman |
| 5,774,877 | A | 6/1998 | Patterson |
| 5,787,402 | A | 7/1998 | Potter et al. |
| 5,793,301 | A | 8/1998 | Patterson |
| 5,797,002 | A | 8/1998 | Patterson |
| 5,806,050 | A | 9/1998 | Shinn et al. |
| 5,845,266 | A | 12/1998 | Lupien |
| 5,915,245 | A | 6/1999 | Patterson |
| 5,924,082 | A | 7/1999 | Silverman |
| 5,924,083 | A | 7/1999 | Silverman |
| 5,946,667 | A | 8/1999 | Tull |
| 5,963,923 | A | 10/1999 | Garber |
| 6,012,046 | A | 1/2000 | Lupien |
| 6,014,643 | A | 1/2000 | Minton |
| 6,035,287 | A | 3/2000 | Stallaert |
| 6,098,051 | A | 8/2000 | Lupien |
| 6,131,087 | A | 10/2000 | Luke |
| 6,134,535 | A | 10/2000 | Belzberg |
| 6,195,647 | B1 | 2/2001 | Martyn |
| 6,272,474 | B1 | 8/2001 | Garcia |
| 6,278,982 | B1 | 8/2001 | Korhammer |
| 6,282,521 | B1 | 8/2001 | Howorka |
| 6,408,282 | B1 | 6/2002 | Buist |
| 6,418,419 | B1 | 7/2002 | Nieboer |
| 6,519,574 | B1 | 2/2003 | Wilton et al. |
| 6,766,304 | B2 | 7/2004 | Kemp |
| 6,912,511 | B1 | 6/2005 | Eliezer et al. |
| 6,996,540 | B1 | 2/2006 | May |
| 7,110,974 | B1* | 9/2006 | Rust ............................ 705/37 |
| 7,177,833 | B1* | 2/2007 | Marynowski et al. ......... 705/38 |
| 7,225,153 | B2 | 5/2007 | Lange |
| 2001/0042040 | A1 | 11/2001 | Keith |
| 2001/0044770 | A1 | 11/2001 | Keith |
| 2001/0049651 | A1 | 12/2001 | Selleck |
| 2001/0051909 | A1 | 12/2001 | Keith |
| 2002/0023038 | A1 | 2/2002 | Fritsch |
| 2002/0046146 | A1 | 4/2002 | Otero |
| 2002/0046149 | A1 | 4/2002 | Otero |
| 2002/0046151 | A1 | 4/2002 | Otero |
| 2002/0046156 | A1 | 4/2002 | Horn |
| 2002/0049661 | A1 | 4/2002 | Otero |
| 2002/0055899 | A1 | 5/2002 | Williams |
| 2002/0059129 | A1 | 5/2002 | Kemp |
| 2002/0091617 | A1 | 7/2002 | Keith |
| 2002/0099644 | A1 | 7/2002 | Kemp |
| 2002/0128950 | A1 | 9/2002 | Wu |
| 2002/0138401 | A1 | 9/2002 | Allen |
| 2002/0188555 | A1 | 12/2002 | Lawrence |
| 2002/0194115 | A1 | 12/2002 | Nordlicht et al. |
| 2003/0004852 | A1 | 1/2003 | Burns |
| 2003/0004853 | A1 | 1/2003 | Ram |
| 2003/0009411 | A1 | 1/2003 | Ram |
| 2003/0014351 | A1 | 1/2003 | Neff et al. |
| 2003/0023542 | A1 | 1/2003 | Kemp |
| 2003/0033235 | A1 | 2/2003 | Hummelgren |
| 2003/0069830 | A1 | 4/2003 | Morano et al. |
| 2003/0101125 | A1 | 5/2003 | McGill et al. |
| 2003/0130929 | A1 | 7/2003 | Waddell |
| 2003/0154152 | A1 | 8/2003 | Gilbert et al. |
| 2003/0200167 | A1 | 10/2003 | Kemp |
| 2004/0267655 | A1* | 12/2004 | Davidowitz et al. |
| 2005/0154668 | A1 | 7/2005 | Burns |
| 2006/0259409 | A1 | 11/2006 | Burns |
| 2006/0259412 | A1 | 11/2006 | Kemp et al. |

FOREIGN PATENT DOCUMENTS

| | | |
|---|---|---|
| EP | 1104904 A1 | 6/2001 |
| EP | 1217564 A2 | 6/2002 |
| EP | 1217564 A3 | 7/2002 |
| EP | 1246111 A2 | 10/2002 |
| WO | WO9114231 A1 | 9/1991 |
| WO | WO95/26005 A1 | 9/1995 |
| WO | WO9849639 A1 | 11/1998 |
| WO | WO9919821 A1 | 4/1999 |
| WO | WO99/30259 A1 | 6/1999 |
| WO | WO9953424 A1 | 10/1999 |
| WO | WO00/51043 A1 | 8/2000 |
| WO | WO00/52619 A1 | 9/2000 |
| WO | WO00/62187 A2 | 10/2000 |
| WO | WO0062187 A3 | 10/2000 |
| WO | WO00/65510 A1 | 11/2000 |
| WO | WO001/16830 A1 | 3/2001 |
| WO | WO01/16852 A2 | 3/2001 |
| WO | WO01/22266 A2 | 3/2001 |
| WO | WO01/22315 A2 | 3/2001 |
| WO | WO0122315 A3 | 3/2001 |
| WO | WO0165403 A2 | 9/2001 |
| WO | WO01/88808 A1 | 11/2001 |
| WO | WO02/33621 A1 | 4/2002 |
| WO | WO02/33623 A1 | 4/2002 |
| WO | WO02/33635 A1 | 4/2002 |
| WO | WO02/33636 A1 | 4/2002 |
| WO | WO02/33637 A1 | 4/2002 |
| WO | WO0229686 A1 | 4/2002 |
| WO | WO02/47006 A1 | 6/2002 |
| WO | WO0116852 C1 | 6/2002 |
| WO | WO02/079940 A2 | 10/2002 |
| WO | WO02/080433 A2 | 10/2002 |
| WO | W002/097580 A2 | 12/2002 |
| WO | WO02103601 A1 | 12/2002 |
| WO | WO03090032 A2 | 10/2003 |
| WO | WO03090032 A3 | 10/2003 |

OTHER PUBLICATIONS

International Search Report and Written Opinion issued in PCT/US05/09180.

McInish et al., "An Analysis of Intraday Patterns in BidAsk Spreads for NYSE Stocks", The Journal of Finance, vol. 47, No. 2 (Jun. 1992), pp. 753-764.

International Search Report for PCT/US03/06445.

USPTO Presentation, NASDAQ, Nov. 8, 2001.

Kharouf, A Trading Room with a View, Futures, 27, 11-Nov. 1988.

www.tradingtechnologies.com/products/xtrade_full.html (viewed May 22, 2001) Jun. 9, 2000.

MTS News—Mar. 2002.

Chan et al. "The Intraday Behavior of Bid-Ask Spreads for NYSE Stocks and CBOE Options", The Journal of Financial and Quantitative Analysis, vol. 30, No. 3 (Sep. 1995) pp. 329-346.

George, et al., "Bid-Ask spreads and Trading Activity in the S&P 100 Index Options Market", The Journal of Financial and Quantitative Analysis, vol. 28, No. 3 (Sep. 1993) pp. 381-397.

* cited by examiner

| Contract | WrkBuys | BidQty | BidPrc | AskPrc | AskQty | WrkSells | NetPos | FfNetPos | LastPrc | LastQty | Total | Chng |
|---|---|---|---|---|---|---|---|---|---|---|---|---|
| FDAX MAR02 | | 1 | 5166.5 | 5167.5 | 6 | | | | 5167.0 | 4 | 114 | |
| FDAX JUN02 | | | | | | | | | | | | |
| FESX MAR02 | | 40 | 3715.0 | 3716.0 | 11 | | | | 3716.0 | 47 | 196 | |
| FESX JUN02? | | | | | | | | | | | | |
| FGBL MAR02 | | 102 | 107.39 | 107.40 | 14 | | | | 107.40 | 717 | 13693 | |
| FGBL JUN02 | | | | | | | | | | | | |
| FGBM MAR02 | | 151 | 106.02 | 106.03 | 507 | | | | 106.02 | 326 | 7737 | |
| FGBM JUN02 | | | | | | | | | | | | |
| FGBS MAR02 | | 1740 | 103.37 | 103.38 | 136 | | | | 103.38 | 4599 | 10293 | |
| FGBS JUN02 | | | | | | | | | | | | |
| FN50 MAR02 | | 122 | 1180.0 | 1184.0 | 25 | | | | 1180.0 | 220 | 220 | |
| FN50 JUN02 | | | | | | | | | | | | |
| FSMI MAR02 | | 5 | 6394.0 | 6397.0 | 18 | | | | 6395.0 | 192 | 224 | |
| FSMI JUN02 | | | | | | | | | | | | |
| FSTX MAR02 | | 10 | 3613.0 | 3616.0 | 12 | | | | 3615.0 | 20 | 32 | |
| FSTX JUN02 | | | | | | | | | | | | |

SELECTED CONTRACTS USED IN A 2-LEG SPREAD

FIG. 5

SYSTEM AND METHOD FOR ESTIMATING A SPREAD VALUE

CROSS-REFERENCE TO RELATED APPLICATION

This application is a continuation of U.S. patent application Ser. No. 10/804,631, filed Mar. 19, 2004, which is a continuation-in-part of U.S. patent application Ser. No. 10/137,979 filed on May 3, 2002, entitled "System and Method for Performing Automatic Spread Trading," which claims the benefit of U.S. Provisional Patent Application Ser. No. 60/361,958 filed Mar. 5, 2002, the contents of which are fully incorporated herein by reference.

FIELD OF THE INVENTION

The present invention is generally directed to electronic trading, and in particular, facilitates trading of any tradeable object in an electronic trading environment.

BACKGROUND

Electronic trading systems provide buyers and sellers, collectively referred to as traders, with best offer data and best bid data for a given tradeable object in addition to other useful market data such as additional order information besides the best offer and bid data, fill information, the last traded price ("LTP") and the last traded quantity ("LTQ"). The LTQ generally reflects the quantity of the last match performed by the exchange's matching engine, while the LTP generally reflects the price level of the match.

As used herein, a tradeable object simply refers to anything that can be traded with a price and/or quantity. Examples of tradeable objects may include, but are not limited to, all types of traded events, goods and/or financial products, such as, for example, stocks, options, bonds, futures, currency, and warrants, as well as funds, derivatives and collections of the foregoing. Moreover, tradeable objects may include all types of commodities, such as grains, energy, and metals. A tradeable object may be "real", such as products that are listed by an exchange for trading, or "synthetic", such as a combination of real products that is created by the trader. A tradeable object could actually be a combination of other tradeable objects, such as a class of tradeable objects.

Technical analysis may be used to assist traders in making their trades. Generally speaking, technical analysis is the process of analyzing a tradeable object's present and historical prices and other related data in an effort to determine, among other things, probable future prices. Technical analysis may result in detecting market trends, predicting turning points and market direction. Traders can study the information and take certain actions based on that information. Even if forecasting prices is not completely accurate, given the dynamic and often unpredictable nature of the markets, technical analysis may still be useful in reducing the risks and improving the profits. Although it is not the only one, a primary tool of technical analyses is a chart.

One area of trading where traders might use technical analysis is spread trading. Spread trading is the buying and/or selling of two or more tradeable objects, the typical purpose of which is to capitalize on changes or movements in the relationships between the tradeable objects. The relationship between the tradeable objects might be based on a real relationship or simply a perceived one by the trader. A spread trade could involve buying two or more tradeable objects, buying and selling two or more tradeable objects, selling two or more tradeable objects or some combination thereof. In some financial areas, such as in the futures industry, the tradeable objects being spread might be contracts for different delivery months (e.g., expiration dates) of the same tradeable object or contracts of the same tradeable object at different strike prices. Sometimes, spread trading involves different tradeable objects or the same tradeable object on different exchanges.

Here are some simple examples of spread trading: A trader might spread trade a June corn tradeable object and a December corn tradeable object. To do so might involve buying the June corn tradeable object, based on the December market, and selling the December corn tradeable object, or vice versa. Spreading can also be done based on other relationships besides calendar months. One such example would be trading a 10-year note and a 5-year note. According to these two examples given directly above, each spread has two legs. As used herein, legs refer to the portions of the trades associated with each individual tradeable object, which is also referred to as an outright market. For instance, the June/December corn calendar spread has two legs, the June corn tradeable object makes up one leg and the December corn tradeable object makes up the other leg.

Spread trading can also involve more than two legs. For example, a well-known strategy called the butterfly involves buying a near month tradeable object, selling two middle month tradeable objects, and buying a far month tradeable object. An example might be buying one March corn tradeable object, selling two June corn tradeable objects, and buying one December corn tradeable object. The butterfly strategy in this example has three legs. The March corn tradeable object makes up one leg, the June corn tradeable object makes up a second leg, and the December corn tradeable object makes up a third leg. There are many other types of well-known strategies in addition to the butterfly that involve more than two legs.

According to conventional technical analysis techniques, an estimated last traded price ("estimated LTP") for a spread is computed and used in analyzing the value of the spread. The estimated LTP represents a price at which a trader might have been able to buy or sell a spread given the last traded prices of the legs. In particular, when a trade occurs in one leg, a conventional software application looks to the last traded price in each of the other legs, and together with the most recent traded price in the leg that traded computes the estimated LTP of the spread. This process repeats every time a trade occurs in one of the legs. Although the estimated LTP values consist of only estimated prices at which a spread might possibly have been bought or sold, they can provide the trader with a historical trail of valuable market information that may be used in determining the trader's next action.

Often times, the estimated LTP values of the spread are displayed in a chart to the trader. There are many styles of charts that may be used and they may include an area, bar, candlestick, or line chart. Using a chart, traders may visually spot trends and react accordingly. The estimated LTP values might also be displayed in some other graphical form or they may be displayed in a textual or numerical format. In some instances, these values might not be displayed at all, but rather used by an automated or semiautomatic trading tool in carrying out its particular trading strategy.

Given liquid markets where trades are frequently occurring in each of the legs, conventional technical analysis techniques may provide valuable and useful information to the trader. This is because the calculation uses the last traded price for each leg, which update often in liquid markets. Nonetheless, if the trades begin to lag the market's movement in any of the legs, the estimated LTP of the spread can quickly become outdated and inaccurate. As such, using conventional techniques, the estimated LTP of the spread is not really a true representation of the current spread value. Accordingly, conventional technical analysis techniques fall short of providing the trader with a complete and accurate picture of the value of a spread.

There is a need for an improved way to estimate the value of a spread.

BRIEF DESCRIPTION OF THE DRAWINGS

FIG. 5 shows a market grid window that displays tradeable objects (contracts) and market information corresponding to the tradeable objects;

DETAILED DESCRIPTION

I. General Overview

Figure 1:
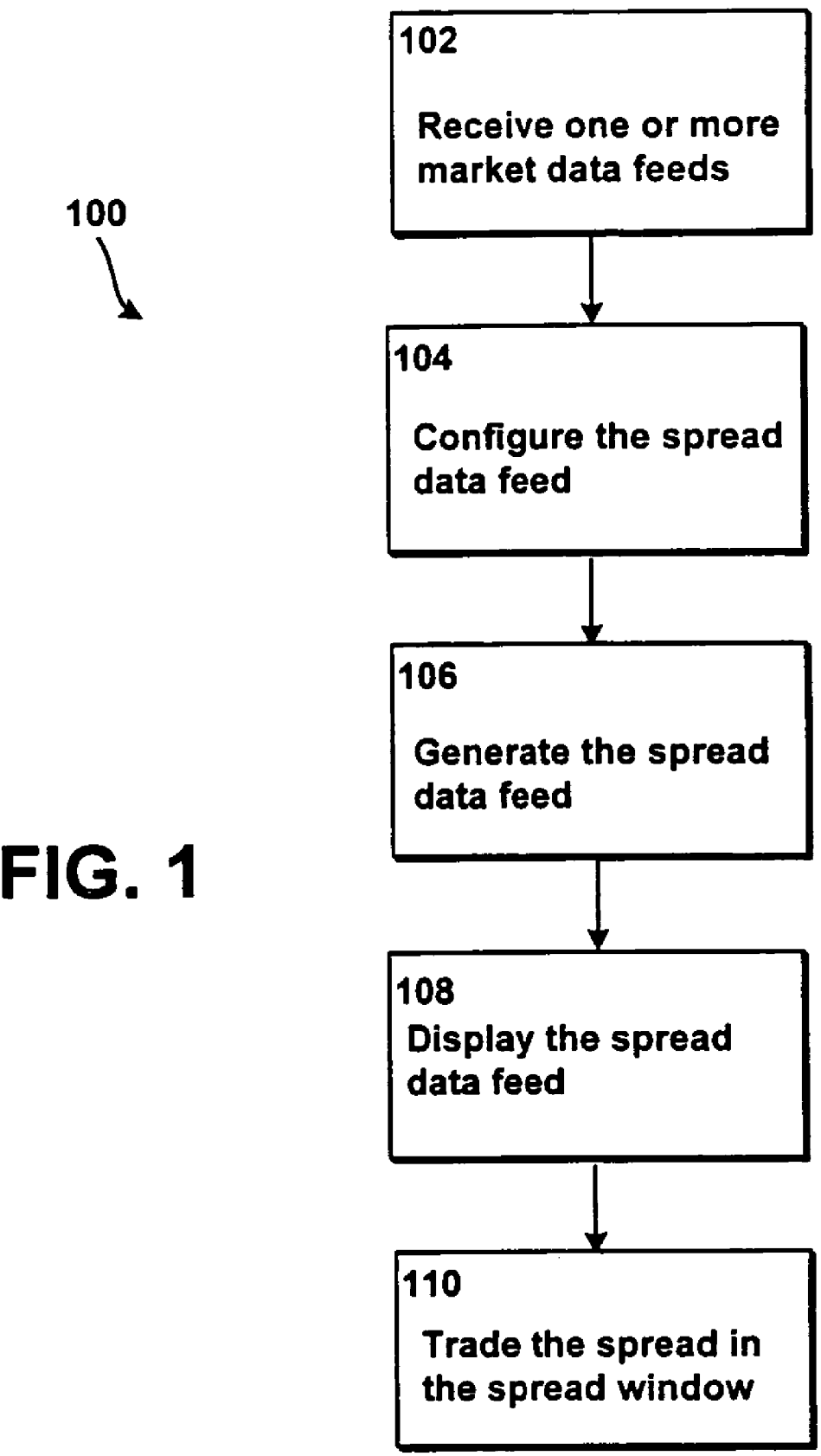
FIG. 1 shows a generalized flowchart showing a method for facilitating the automatic trading of spreads.

In one embodiment, an "automatic spreader" is provided to facilitate the automatic trading of spreads. According to this embodiment, a user selects the individual tradeable objects underlying the spread, referred to herein as the "legs" of the spread. The automatic spreader generates a spread data feed based on information in the legs and based on spread setting parameters, which are configurable by a user. The spread data feed is communicated to a graphical user interface manager ("GUI manager") where it is displayed in a spread window and the legs may also be displayed, but preferably, the legs are displayed in separate windows from the spread window. At the electronic terminal, the user can enter orders in the spread window and the automatic spreader will automatically work the legs to achieve (or attempt to achieve) the spread. It should be understood that those skilled in the art of trading are familiar with a wide variety of spread trading techniques and the present embodiments are not limited to any particular type of spread trading technique.

In another embodiment, data is computed that represents an improved calculation of the estimated last traded price ("estimated LTP") at which a trader might have been able to buy or sell a spread given the current market conditions of the legs of the spread. According to the preferred embodiments, techniques that are consistent with a trader's strategy of buying and/or selling a spread are utilized so that the estimated LTP and the estimated last traded quantity ("estimated LTQ") calculations will more accurately reflect the price at which a spread trade would have occurred. In particular, upon detecting an event in one leg, such as a trade, the preferred embodiments look only to relevant pieces of market information in the other leg(s) to complete the spread, and together with information from the most recently traded leg computes the estimated LTP and/or the estimated LTQ of the spread. This process repeats every time an event occurs, where an event might include, for example, detecting a trade, detecting a change in the inside market, or both. According to the preferred embodiments, the value of the spread may be accurately characterized.

The estimated LTP and LTQ values of the spread may be used to analyze a spread and/or multiple tradeable objects. In one embodiment, the data can be formatted into a chart for viewing by a trader. In another embodiment, the data can be fed into an automated or semi-automated trading tool for use in executing a particular trading strategy. In yet another embodiment, the computed data may simply be displayed on a trading screen. It is understood that the scope of the present invention is not limited by the use of the estimated values. Rather, the estimated values may be used in any particular way to assist the traders.

Other systems, methods, features, and advantages of the present invention will be or become apparent to one with skill in the art upon examination of the following drawings and description. It is further understood that the description contained herein is considered as illustrative only of the various aspects of the preferred embodiments. Further, since numerous modifications and changes will readily occur to those skilled in the art, it is not desired to limit the present invention to the construction and operation shown and described, and accordingly, all suitable modifications and equivalents may be resorted to. It is intended that all such additional systems, methods, features, and advantages be within the scope of the present invention, and be protected by the accompanying claims.

II. Example System Operation and Function

FIG. 1 is a flowchart 100 that, in general, shows a method for facilitating the automatic trading of spreads according to the present embodiments. Each step of the flowchart 100 is described with respect to the various sections below. It should be understood, however, that the flowchart 100 provides only an illustrative description of the operation of the automatic spreader, and that more or fewer steps may be included in the flowchart 100, and/or the steps may occur in one or more orders which are different from the order of steps shown in FIG. 1. For example, the step 104 "configure the spread data feed," may occur before or at the same time as the step 102 "receive one or more market data feeds."

A. Receiving Data Feeds from One or more Exchanges

At step 102, market data feeds are received from one or more exchanges. A market data feed generally includes the price, order, and fill information for an individual tradeable object. In a preferred embodiment, the market data feed provides the highest bid price (HBP) and the lowest ask price (LAP) for a particular tradeable object, referred to as the "inside market," in addition to the current bid and ask prices and quantities in the market, referred to as "market depth." Some exchanges provide an infinite market depth, while others provide no market depth or only a few prices away from the inside market. The number of market data feeds received at step 102 may depend on the number of tradeable objects selected for spread trading by a user, or alternatively, some or all of the data feeds from an exchange are received and only those tradeable objects which are part of the spread are traded.

Figure 2:
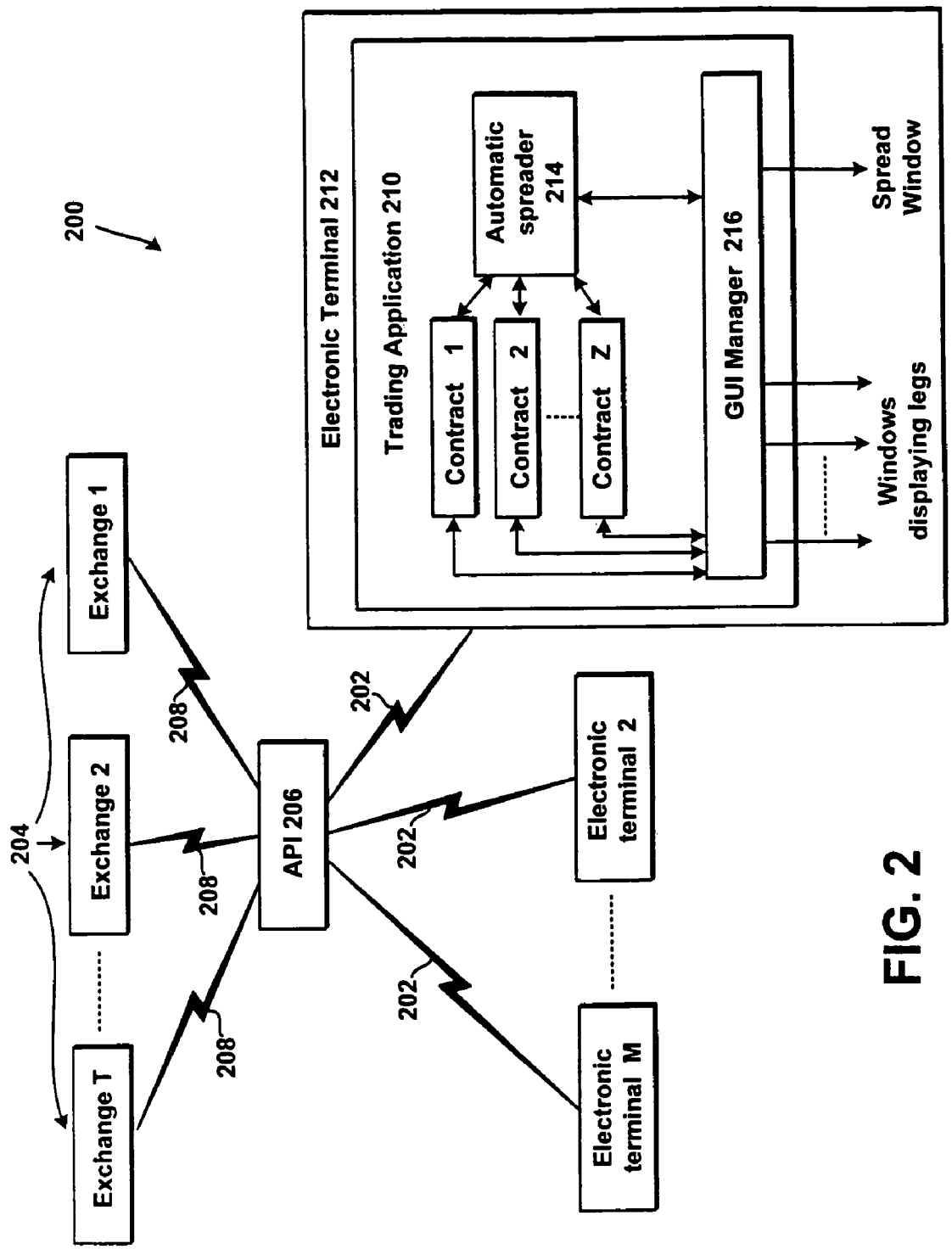
FIG. 2 shows a preferred system that is suitable for facilitating the automatic trading of spreads.

FIG. 2 shows an example system 200 that is suitable for facilitating the automatic trading of spreads. The system 200 includes an applications program interface ("API") 206 that translates market data 208 for one or more tradeable objects to an appropriate data format, referred to as market data feed(s) 202, which are communicated between the different exchanges and trading applications hosted on the electronic terminals. Electronic terminals may be computing devices such as personal computers, laptop computers, hand-held devices, and so forth. The system 200 preferably supports up to "T" exchanges and up to "M" electronic terminals.

An electronic terminal 212 is shown in more detail to illustrate the interaction between its software and/or hardware components. The electronic terminal 212 includes many components, some of which are not shown for purposes of clarity, but those that are shown include a trading application 210, an automatic spreader 214, and a GUI manager 216. In a preferred embodiment, the trading application 210 and the automatic spreader 214 are software applications hosted on the electronic terminal 212. Although the automatic spreader 214 is shown together with the trading application 210, it should be understood that the automatic spreader 214 and the trading application may be the same software application or separate software applications on the same or different terminals. Alternatively, the automatic spreader 214 and/or the trading application 210 are hosted on a server and accessed by the electronic terminal 212 over a network. The GUI manager 216 is a software application (as shown in FIG. 2), but preferably may work with hardware components such as an input device like a mouse, keyboard, or touch screen, and an output device like a monitor, for example.

Figure 7:
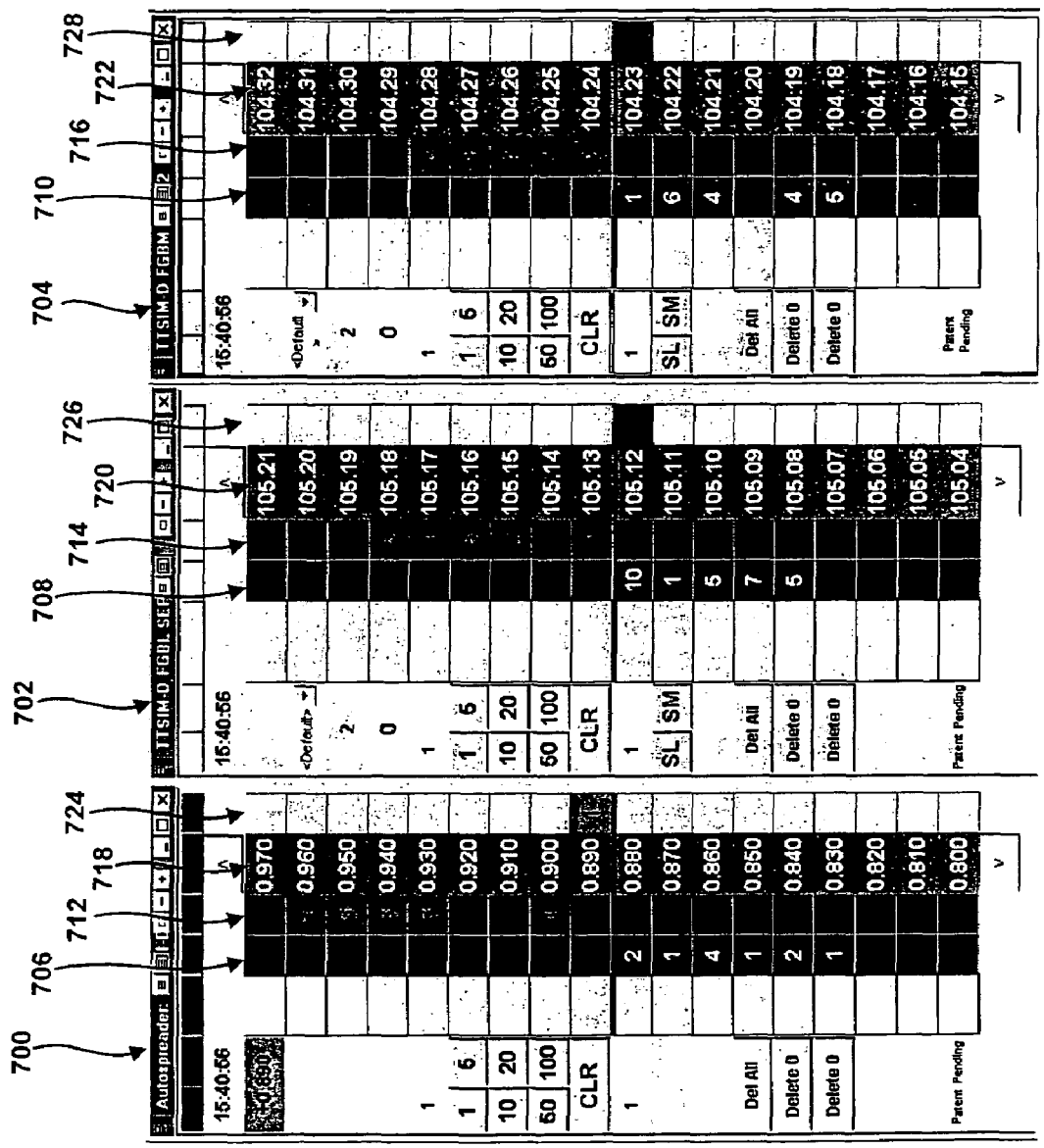
FIG. 7 shows a preferred type of spread window and two legs that, in this example, are generated upon pressing the "OK" icon in the spread configuration window in FIG. 6.

In the preferred embodiments, the trading application 210 is an X_TRADER® trading application which is commercially available from Trading Technologies, Inc. of Chicago, Ill. The X_TRADER® trading application incorporates display screens of the type illustrated in FIG. 7 and such display screens are sometimes referred to herein as MD_TRADER™-style displays. MD_TRADER™-style displays show information, such as market depth or working orders, in association with an axis or scale of prices. FIG. 7 shows an embodiment in which the system displays the market depth on a vertical plane, which fluctuates logically up or down the plane as the market prices fluctuate. The invention is not limited, however, to any particular type of display—the information could be displayed on a horizontal plane, n-dimensionally or in any other fashion. The MD_TRADER™-style display is described in U.S. patent application Ser. No. 09/590,692, entitled "Click Based Trading With Intuitive Grid Display of Market Depth," filed on Jun. 9, 2000, and U.S. patent application Ser. No. 09/971,087, entitled "Click Based Trading With Intuitive Grid Display Of Market Depth And Price Consolidation," filed on Oct. 5, 2001, the contents of both are incorporated by reference herein. Moreover, the trading application 210 may implement tools for trading tradeable objects that are described in a U.S. patent application Ser. No. 10/125,894 filed on Apr. 19, 2002, entitled "Trading Tools for Electronic Trading," the contents of which are incorporated by reference.

Turning back to FIG. 2, in general, "Z" market data feeds (for a total of Z tradeable objects or contracts) are communicated from the API 206 to the trading application 210 where they are stored and continuously updated (or periodically updated). Using some or all of the Z market data feeds and the spread setting parameters, the automatic spreader 214 generates a third data feed, referred to herein as a spread data feed. The spread data feed preferably includes spread price, and spread market depth, but may alternatively include other items of interest to the user such as the last traded price (LTP) and the last traded quantity (LTQ). The configuration and generation of the spread data feed using the market data feeds and the spread setting parameters are described in the sections below. The spread data feed is communicated to the GUI manager 216 where it can be displayed in a spread window and traded.

B. Configuring the Spread

Referring back to the flowchart 100 in FIG. 1, at step 104, the spread data feed may be uniquely configured by a user to customize, among other things described below, calculation of spread prices and spread market depth. Preferably, the calculation of spread prices and spread market depth are based on the bids and offers from the actual markets for the tradeable objects of the legs and the spread setting parameters, which are set by the user. In the preferred embodiment, the user may re-configure existing spreads, or the user can create new spreads to configure by first selecting the underlying tradeable objects (legs) for the spread. Once the tradeable objects are selected, the spread may be configured by the user upon the entering of spread setting parameters in a configuration window, described below.

Figure 3:
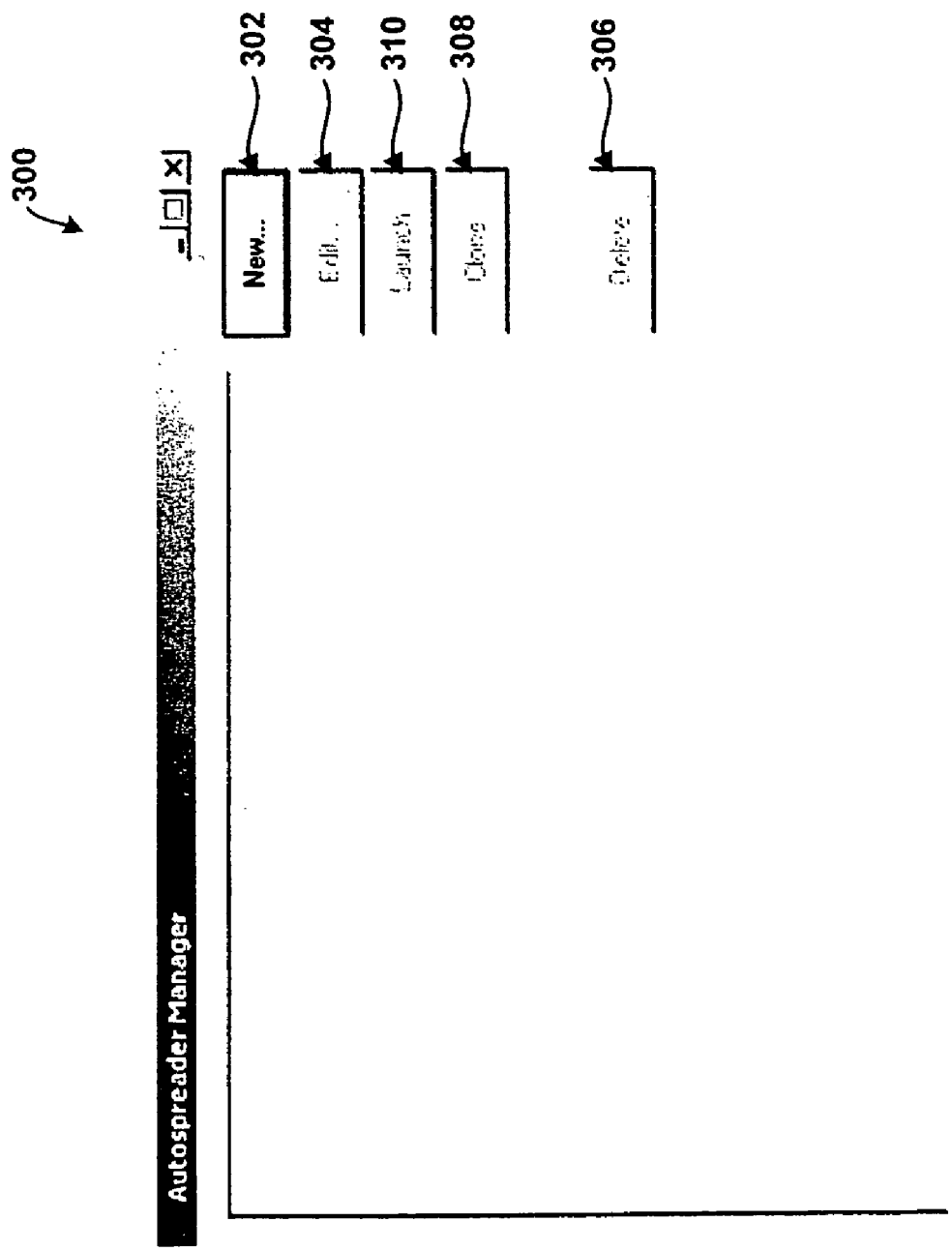
FIG. 3 shows a preferred spread manager window that may be used to create new spreads, edit and/or delete existing ones, and that can display a list of the created spreads.

FIG. 3 shows an example spread manager window 300 that may be used to create new spreads, edit and/or delete existing ones, and that can display a list of the created spreads. In the preferred embodiment, the spread manager window 300 is opened upon execution of the automatic spreader. The spread manager window 300 has a number of icons that can be used to launch spreads which have already been created, as well as, create new spreads or edit and/or delete existing ones. Preferably, the icons are "grayed out" (icons 304, 306, 308, and 310 are shown "grayed out") to indicate to the user that the option is not available at the present time. When the option is available to the user, the icon will return to black text (such as icon 302) indicating that the option may be used. The icons include: "New" 302 that when pressed opens a new configuration spread window used to create a new spread (e.g., see the configuration spread window 400 in FIG. 4); "Edit" 304 that when pressed opens the configuration window already filled in with the spread information for the spread selected from the list (e.g., see the configuration spread window 600 in FIG. 6); "Delete" 306 that when pressed deletes the spread selected from the list for the workspace; "Clone" 308 that when pressed duplicates the selected spread and adds it to the list with the word 'copy' added to the end of the spread title to distinguish between spreads; "Launch" 310 that when pressed, an instance of the spread window with the spread parameters selected during its initial creation is displayed. More or fewer icons may be provided depending on the application.

Figure 4:
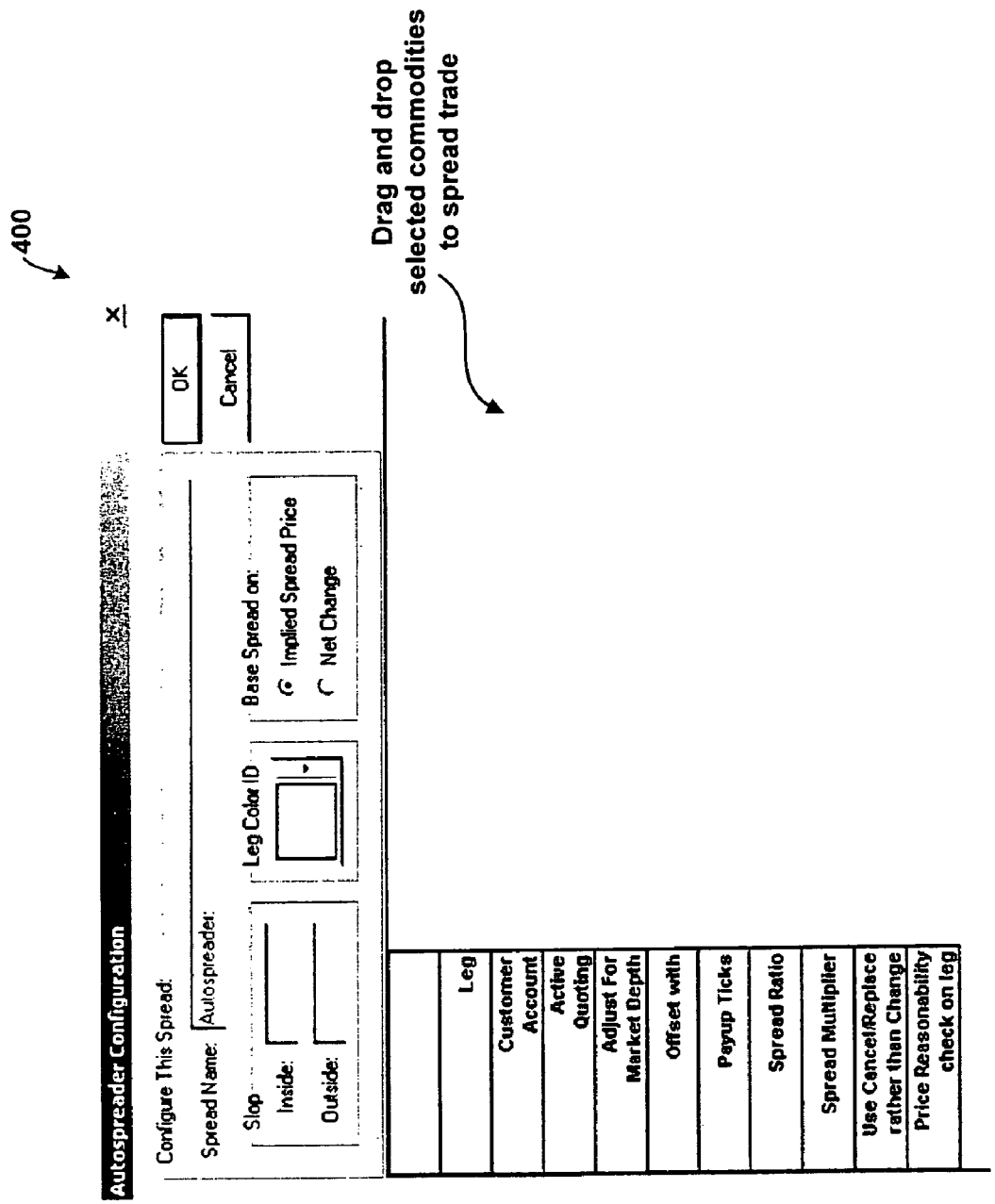
FIG. 4 shows a preferred spread configuration window that may be accessed via the spread manager window in FIG. 3.

FIG. 4 shows a preferred spread configuration window 400 that may be opened upon pressing "New" 302 in the spread manager window 300 in FIG. 3. The spread configuration window 400 may be used to create a new spread by adding one or more legs to it. There are many ways in which legs may be added to the spread window 400 and include selecting two or more tradeable objects from a market grid window (e.g., see the market grid window 500 in FIG. 5) and dragging them into the spread configuration window 400, or selecting two or more tradeable objects from the market grid window, and through a pop-up menu, selecting to spread trade only the highlighted tradeable objects. Alternatively, one leg at a time may be individually selected and dragged into the spread configuration window 400. Other methods and icons may be used for adding the legs to the spread configuration window 400 such as having an icon that allows a user to browse a list of tradeable objects and select the desired tradeable objects from the list, or having a field that allows a user to enter the desired tradeable objects in by name, and so forth.

FIG. 5 shows an example of a market grid window 500 that displays tradeable objects (contracts) and market information corresponding to the tradeable objects. In one embodiment, a user may select two or more tradeable objects by highlighting the tradeable objects with an input device such as a mouse, keyboard, or touch screen. Upon highlighting the tradeable objects, the user may drag them into a spread configuration window (e.g., the spread configuration window 400 in FIG. 4) to create a new spread, or the user may instead click on the highlighted tradeable objects in the market grid window 500 to get a pop-up menu and then select an option in the pop-up menu to spread only the highlighted tradeable objects. Note that there are many other known ways, not described here, in which legs can be added to the spread configuration window.

Figure 6:
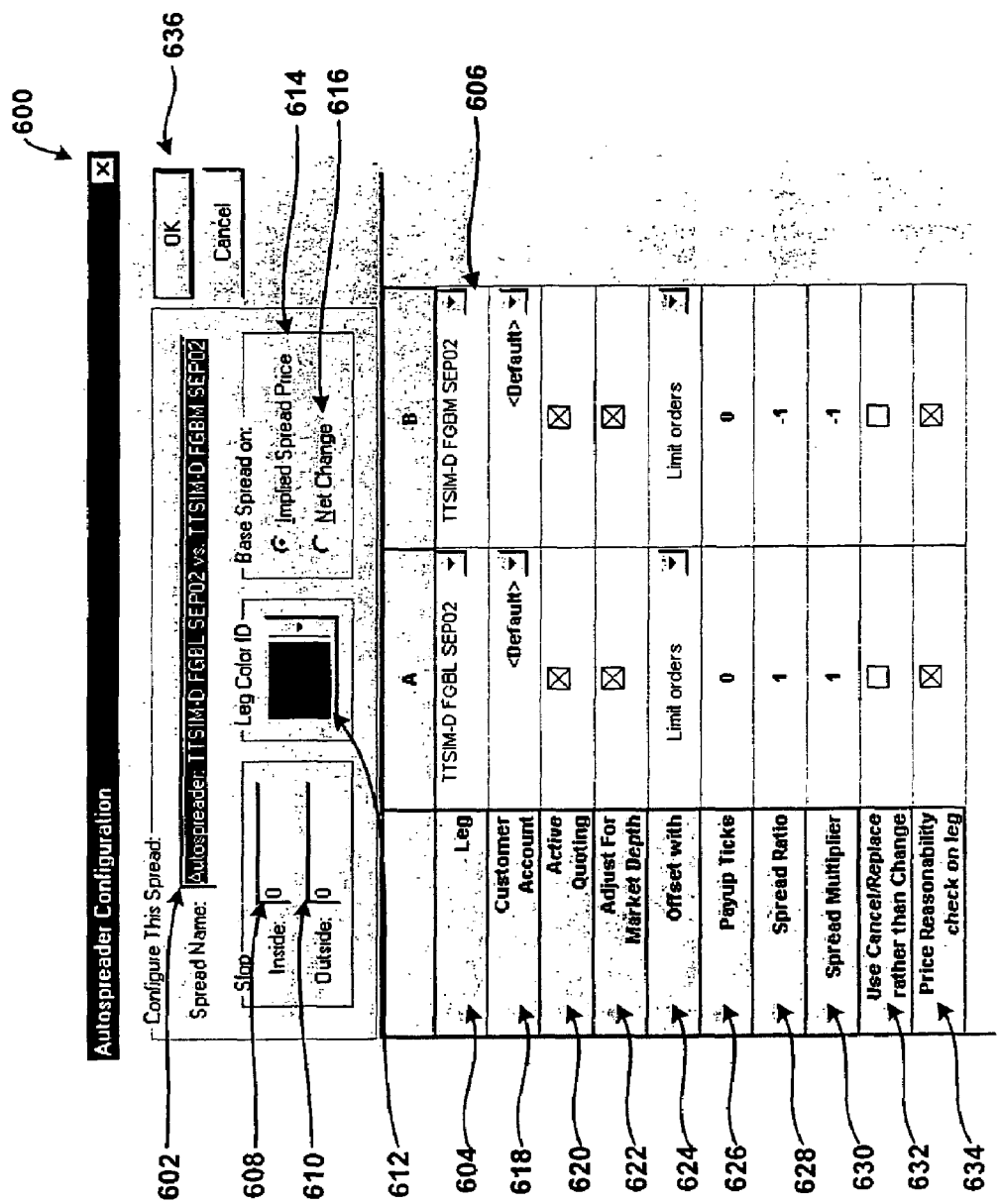
FIG. 6 shows a spread configuration window that already has two legs added to it, although any number of legs may be added.

FIG. 6 shows a spread configuration window 600 that already has two legs added to it, although any number of legs may be added to the spread configuration window 600. Preferably, the spread configuration window 600 has many spread setting parameters that can be set by a user to customize the spread data feed. As such, the spread setting parameters may control the behavior of the spread as it is generated and/or displayed and/or traded, depending on the particular parameter. Although each spread setting parameter shown in FIG. 6 will be explained in greater depth below with respect to its function, a preferable list of them are provided here. The "Spread Name" 602 provides the name of the spread and/or the names of the underlying tradeable objects (e.g., "TTSIM-D FGBL SEP02 vs. TTSIM-D FGBM SEP02"). Moreover, the names of the legs are displayed in the "Leg" fields 604 and 606. Alternatively, a user can personalize the spread by renaming the spread and/or the legs to have any desired name. Other parameters include "Inside Slop" 608, "Outside Slop" 610, "Leg Color ID" 612, "Implied Spread Price" 614, "Net Change" 616, "Customer Account" 618, "Active Quoting" 620, "Adjust for Market Depth" 622, "Offset with" 624, "Payup Ticks" 626, "Spread ratio" 628, "Spread Multiplier" 630, "Use Cancel/Replace rather than Change" 632, and "Price Reasonability check on leg" 634. A user may select "OK" 636 when the spread has been configured to open a spread window and leg windows. It will be appreciated by those skilled in the art that the parameters above may be flexible and/or changed as circumstances dictate because of the wide range of products that can be traded using the automatic spreader. Moreover, the columns in the spread configuration window 600 can be dragged and dropped such that the user can re-arrange the order of the legs.

C. Generation of the Spread

Referring back to the flowchart 100 in FIG. 1, at step 106, the automatic spreader generates a spread data feed based on selected market data feeds and the spread setting parameters. In a preferred embodiment, the spread data feed includes spread prices and spread depth. Additionally, the spread data feed may also include the last traded price (LTP) and the last traded quantity (LTQ), in addition to other useful items of interest such as open, close, settlement, daily high/low, and so on. Of course, the spread data feed can include more or fewer items of interest, depending on the limits of the exchange from which the market data feed came, and so forth. It is also possible to allow the trader to customize the type of information included in the spread data feed.

The spread data feed may be continuously (or periodically) updated and stored at the electronic terminal according to the received market data feeds. Therefore, the process of generating a spread data feed may continue on a real time basis as such information is relayed from the market. However, the generating of the spread data feed may continue on a periodic time basis, for example, every half-second, if programmed. Preferably, only those values that are displayed in the spread window that change from one moment in time to another are updated on the display.

During spread generation and/or after spread generation, the spread data feed is displayed in a spread window. FIG. 7 illustrates one such type of spread window 700 of the preferred embodiment and its two legs displayed in the "first leg" window 702 and the "second leg" window 704, which are generated upon pressing the "OK" icon 636 in FIG. 6. In FIG. 7, the first leg window 702 corresponds to the "FGBL SEP02" contract, whereas the second leg window 704 corresponds to the "FGBM SEP02" contract. FIG. 7 illustrates a two-legged spread for sake of simplicity and thus illustrates a spread window and two leg windows, however, it should be known that the number of windows displayed depends on the number of legs in the spread and the user's preferences.

Preferably, the windows 700, 702, 704 show the inside market and the market depth of the generated spread data feed (displayed in window 700) and for the legs (displayed in leg windows 702 and 704). Columns 706, 708, and 710 provide the buy quantities and columns 712, 714, and 716 provide the ask quantities at corresponding price levels shown in columns 718, 720, and 722, respectively. Columns 724, 726, and 728 display the user's working orders, described in greater detail with respect to entering orders in the spread window below. As expressed earlier, the MD_TRADER™-style screen displays of the type illustrated in FIG. 7 are described in the above incorporated patent applications entitled "Click Based Trading With Intuitive Grid Display Of Market Depth," "Click Based Trading With Intuitive Grid Display of Market Depth and Price Consolidation," and "Trading Tools for Electronic Trading." It should be understood, however, that the present invention is not limited to this particular type of screen display.

Preferably, the MD_TRADER™-style screen display shown in FIG. 7 is configurable by a user to display one or more icons or fields of interest to the user. This may be advantageous because it allows the user to tailor the display to his or her liking. Some of the icons or fields of interest that can be displayed or hidden by the user include a system clock that shows the current time. A pull-down menu allows a trader to specify which account the trader is trading. Moreover, the Stop Market (SM)/Stop Limit (SL) buttons are optional depending on user preferences and they enable stop limit and stop market orders. The "Del All Button" deletes all bids and offers from the market. Del Bids Button deletes all bids from the market (a "5" is shown to indicate the number of bids which are currently in the market). Del Offers Button deletes all offers from the market (a "0" is shown to indicate the number of offers which are currently in the market). Of course, more or fewer items of interest may be included in the MD_TRADER™-style screen display of FIG. 7, some of which are described in the incorporated patent applications entitled "Click Based Trading With Intuitive Grid Display Of Market Depth," "Click Based Trading With Intuitive Grid Display of Market Depth and Price Consolidation," and "Trading Tools for Electronic Trading."

D. Implied Prices or Net Change

Through a spread configuration window (e.g., see the spread configuration window 600 in FIG. 6), a user can selectively choose whether the generated spread prices are based on implied price levels or net change. Implied price is the price of the spread displayed as a cash value based on the current price for each leg of the spread. Net change is the price of the spread displayed as a net change value based on a price differential over a period which the user selects, such as the previous settlement price for each leg of the spread. Those skilled in the art of trading are familiar with a wide variety of spread pricing techniques and the preferred embodiments are not limited to any particular type of pricing scheme.

In one embodiment, when the spread data feed is based on the implied spread price, the automatic spreader may calculate for any unknown variable such as the implied spread price k or one of the leg prices p, using the following equation. Examples are provided herein to illustrate how the automatic spreader might use this equation to calculate spread prices and quote legs.

$$k = m_{leg1} p_{leg1} + m_{leg2} p_{leg2} + \ldots + m_{legn} p_{legn} \quad [\text{EQN 1}]$$

k=spread price (implied price);
n=total number of legs;
$m_{legn}$=spread multiplier for leg n; and
$p_{legn}$=price for leg n.

In another preferred embodiment, when the spread data feed is based on the net change, the automatic spreader 214 may calculate for any unknown variable such as the net change, k or leg prices p, using the following equation, which may be used instead of EQN 1.

$$k = NCT_{leg1} m_{leg1} + NCT_{leg2} m_{leg2} + \ldots + NCT_{legn} m_{legn} \quad [\text{EQN 2}]$$

k=spread price (net change);
n=total number of legs;
$m_{legn}$=spread multiplier for leg n; and
$NCT_{legn}$=Net Change of the spread over a period for leg n.

In accordance with one embodiment, the spread multipliers, $m_{legn}$, are chosen by the user and attempt to homogenize the tradeable objects in terms of tick and currency differentials. For example, if one product is in Euros and another product is in U.S. dollars, the spread multipliers may be used to convert the two products into a uniform currency (e.g. both in U.S. dollars). The spread multipliers for each leg may also be entered by the user into a spread configuration window (e.g., 600 in FIG. 6). Note also that the automatic spreader may accommodate any spread multiplier values.

E. Determining Spread Bid Depth

Figure 8:
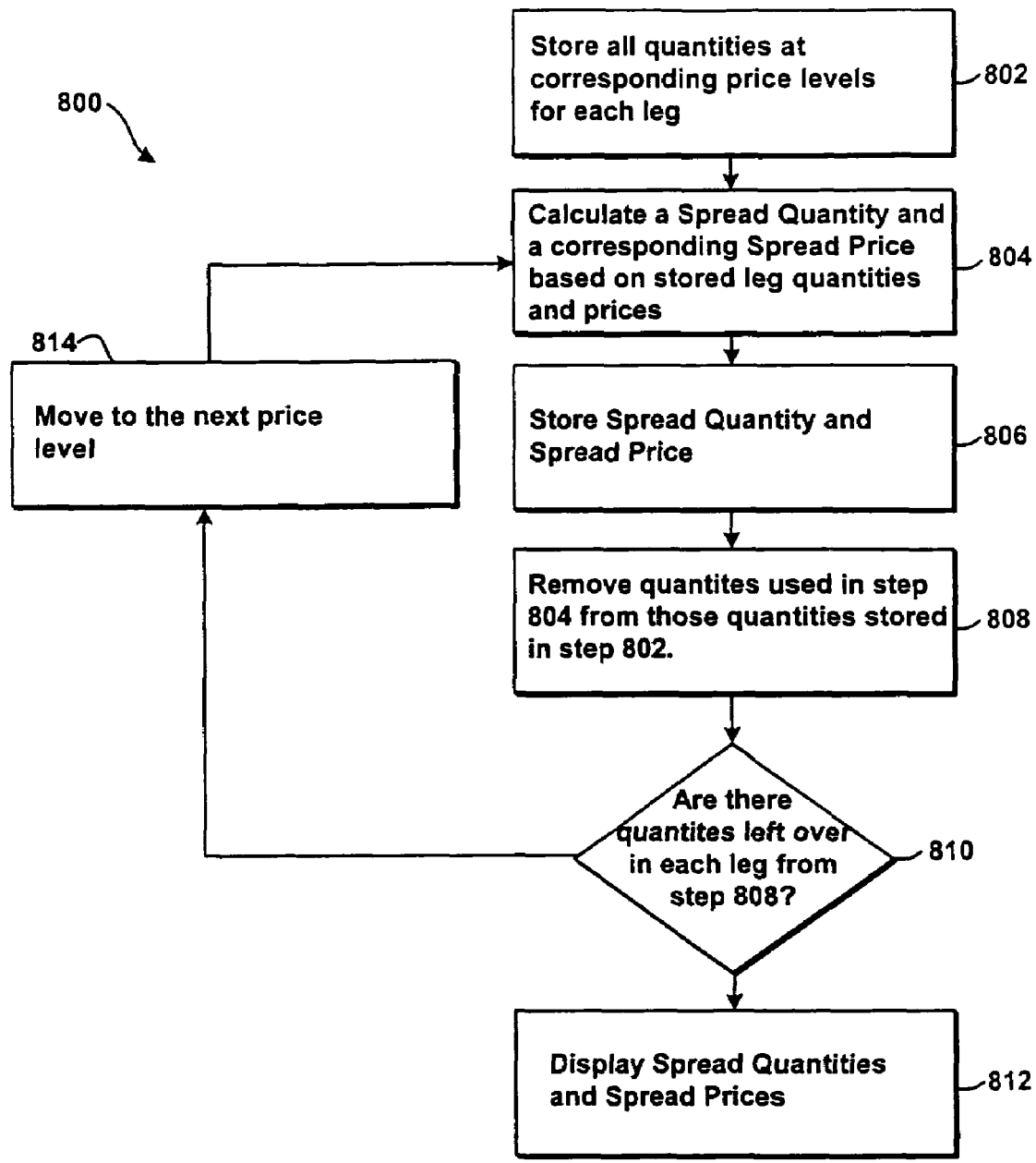
FIG. 8 shows a flowchart that illustrates a method of determining the spread depth and prices, which may then be displayed in the spread window in FIG. 7.

FIG. 8 shows a flowchart 800 that illustrates a method of determining the spread depth and prices, which are then displayed in the buy quantities column 706, sell quantities column 712 and price column 718 of the spread window 700 in FIG. 7. The flowchart 800 illustrates a way to determine the spread depth and prices, however, it should be understood that the flowchart 800 may include more or fewer steps, in the same or different order, to achieve the same result. Thus, the present embodiments should not be limited to the steps shown in flowchart 800.

The following discussion walks through the flowchart 800 with respect to the example spread illustrated and set-up in FIGS. 6 and 7. This particular spread, as configured in FIG. 6, is set up so that for each spread buy there will be a buy in the first leg and a sell in the second leg. This is defined by the spread ratios set at 1 for leg 1 and −1 for leg 2 as shown at 628 in FIG. 6. The spread ratio indicates the quantity of each leg in relation to the others. A positive spread ratio preferably indicates a long leg (i.e., a buy), whereas a negative spread ratio (−) preferably indicates a short leg (i.e., a sell). Any value for the spread ratio(s) may be entered for each leg at 628 in FIG. 6. A spread can be configurable in any number of ways other than the particular spread in FIG. 6.

At step 802, preferably all quantities, which include both buy and sell quantities at each price level in each leg are stored. The quantities are preferably stored in a temporary fashion, such as buffering, in a data file, but alternatively the quantities may be stored for long periods of time for future processing. To illustrate step 802, the quantities in columns 708, 714, 710, and 716 in FIG. 7 are stored at their corresponding price levels. For instance, in column 708 (i.e., the buy column for the first leg) a file may contain data as follows: 10 at 105.12, 1 at 105.11, 5 at 105.10, 7 at 105.09, and 5 at 105.08. Note that in this example only the data in columns 708 and 716 are used in determining spread bid depth and prices, whereas only the data in columns 714 and 710 are used in determining spread ask depth and prices as described below.

Figure 9:
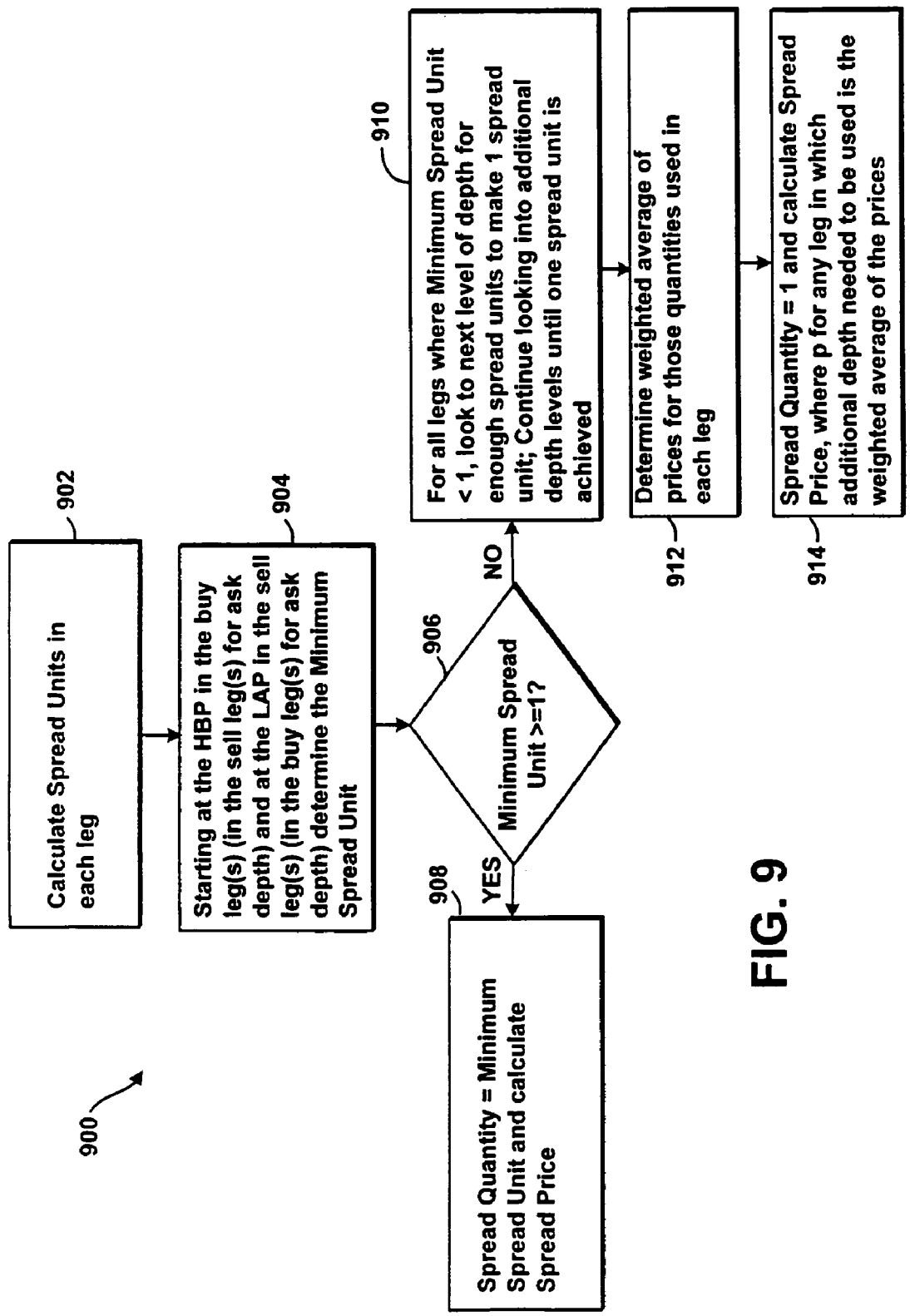
FIG. 9 shows a flowchart that further illustrates the method of determining the spread depth and price in FIG. 8.

At step 804, the automatic spreader can calculate spread quantities at corresponding spread prices based on the stored quantities from step 802. To better illustrate the step of 804, FIG. 9 shows a flowchart 900 that illustrates a method of determining the spread quantities and spread prices.

At step 902, spread units in each leg are calculated, where a spread unit is the absolute value of the quantity available at a price level in a leg divided by the spread ratio for that leg. Recall that the spread ratio is input by the user in the spread configuration window.

$$\text{spread unit} = \text{abs}\left(\frac{Q_{legn}}{\text{ratio}_{legn}}\right) \quad [\text{EQN 3}]$$

Spread units as defined in EQN 3 may be interchangeable with quantities as used herein, depending on the ratio input by the user. Returning back to the example in FIG. 7, the spread ratio of 1 was input for the first leg (i.e., the buy leg) and the spread ration of −1 was input for the second leg (i.e., the sell leg). Therefore, the spread units for column 708 are 10/1=10, 1/1=1, 5/1=5, 7/1=7, and 5/1=5. This is repeated for column 716, except that the spread ratio for the second leg would be used. In another example, assume that a spread ratio of −2 was input for the first leg, then the spread units for column 708 would be 10/2=5, 1/2=0.5, 5/2=2.5, 7/5=3.5, and 5/2=2.5. Again, this would be repeated for column 716. The method of determining spread units is also repeated for columns 714 and 710 when determining spread ask depth and prices described in the following section.

At step 904, preferably starting at the spread units with the highest bid price (HBP) in the buy leg(s) and the spread units with the lowest ask price (LAP) in the sell leg(s), the minimum spread unit is determined. To illustrate step 904, using the example laid out in FIGS. 6 and 7, with a spread ratio of 1 (i.e., a buy leg) for the first leg, and a −1 (i.e., a sell leg) for the second leg, the spread unit at the HBP is 10 at 105.12, and the spread unit at the LAP is 2 at 104.24. The minimum spread unit is 2, that is, 2 is less than 10.

At step 906, if the minimum spread unit is one or greater, the spread quantity is equal to the minimum spread unit (a decimal number greater than 1 may be rounded up/down or truncated), then per step 908, the spread price is calculated using either EQN 1 or EQN 2. Referring back to the example illustrated in FIG. 7, the minimum spread unit is 2, which is greater than 1, so the spread quantity is 2 for this example, and the spread price is calculated to be 0.880 using the following relationship.

$$k = m_{leg1} p_{leg1} + m_{leg2} p_{leg2} + \ldots + m_{legn} p_{legn}$$

k=spread price;
n=2;
$m_{leg1}$=1;
$m_{leg2}$=−1;
$P_{leg1}$=105.12; and
$P_{leg2}$=104.24.

If the minimum spread unit is less than one, then a weighted average of prices is determined, per steps 910, 912, and 914, for each leg that has a minimum spread unit less than one, determined in step 904.

At step 910, assuming that there is a leg with a minimum spread unit less than one, the automatic spreader would look to the next level of depth for enough spread units to make 1 spread unit. For instance, using the numbers illustrated in FIG. 7, assume that the spread ratio for the second leg was −4, then column 716 would be: 0.5, 0.25, 1, 0.25, and 0.75. Therefore, spread units would be added together until one spread unit is found, thus, 0.5+0.25+0.25=1.

At step 912, the weighted average of prices for those spread units used in step 910 is calculated. This weighted average of prices is a price for the leg with the minimum spread unit less that one that is used in either EQN 1 or EQN 2. Using the example in step 910 with a spread ratio of −4, the weighted average may be calculated by the following relationship.

$$(0.5*104.24)+(0.25*104.25)+(0.25*104.26)=104.25$$
(i.e., 104.2475 rounded up)

At step 914, using the example set out in steps 910 and 912, the spread quantity is 1, and the spread price would be calculated as 0.870 using the following relationship.

$$k = m_{leg1} p_{leg1} + m_{leg2} p_{leg2} + \ldots + m_{legn} p_{legn}$$

k=spread price;
n=2;
$m_{leg1}$=1;
$m_{leg2}$=−1;
$p_{leg1}$=105.12; and
$P_{leg2}$=104.25 (the weighted average price for this example).

Returning back to FIG. 8, at step 806, the spread quantity and the spread price are stored in memory, either temporarily or for a longer period of time, depending on the programming.

At step 808, the quantities or spread units that were used in step 804 are preferably removed from the stored quantities in step 802.

At step 810, if there are quantities left over in any leg, then move to step 814, otherwise, per step 812, all of the spread quantities and spread prices stored in step 806 can be displayed in the spread window. The spread quantities are displayed at their corresponding spread prices in a spread window. To illustrate this step, the spread quantities in column 706 in FIG. 7 are displayed at their corresponding spread prices. For instance, in column 706 (i.e., the buy column for the spread) there are 2 at 0.880, 1 at 0.870, 4 at 0.860, 1 at 0.850, 2 at 0.840, and 1 at 0.830. It should be understood that the spread quantities and spread prices may be displayed as they are generated and/or after all of the spread quantities and spread prices are generated, depending on how the automatic spreader is programmed.

In a preferred embodiment, only those values that change from one moment in time to another are updated, but alternatively, all of the values can be updated or refreshed at once on a frequent basis. In addition, the spread quantities and spread prices may be updated when a trader indicates an update, such as re-centering or re-positioning the spread. Re-centering or re-positioning the spread is described in the incorporated patent applications entitled "Click Based Trading With Intuitive Grid Display Of Market Depth," "Click Based Trading With Intuitive Grid Display of Market Depth and Price Consolidation," and "Trading Tools for Electronic Trading." In yet another preferred embodiment, a throttle adjustment, which is set by a trader or programmer, is utilized in combination with one of the above update techniques. In the throttle adjustment embodiment, a value is provided that reduces the number of times the automatic spreader updates the spread quantities and prices. To illustrate the throttle adjustment embodiment, assume that the throttle value is set to 10 milliseconds. Then, when a change to the spread quantities in a leg occurs, the automatic spreader determines if an update to the spread quantities for the spread has occurred within the last 10 milliseconds. If an update has not occurred within the last 10 milliseconds, then an update to the spread quantities for the spread is calculated. If an update has occurred within the last 10 milliseconds, then an update to the spread quantities for the spread is temporarily postponed until 10 milliseconds has past since the last update. The throttle adjustment embodiment preferably reduces the number of calculations the computer processors has to perform in calculating the spread quantities and prices for the spread, thereby freeing the processing to perform other processing tasks.

At step 814, if there are quantities left over, the automatic spreader repeats the process in steps 804, 806, 808, and 810 using only the left over quantity. This is repeated until all of the remaining quantity has been used up in at least one of the legs.

F. Spread Ask Depth

To determine spread ask depth and prices, the method used in determining the spread bid depth and prices above may also be used, except that the automatic spreader will look to the ask depth in the buy leg(s) and the bid depth in the sell leg(s). So, for example, at step 904 in FIG. 9, the automatic spread would start at the spread units with the lowest ask price (LAP) in the buy leg(s) and the spread units with the highest bid price (HBP) in the sell leg(s) to determine which is the minimum spread unit.

As a result of looking to the ask depth in the buy leg(s) and the bid depth in the sell leg(s), per step 812, all of the spread quantities and spread prices stored in step 806 can be displayed in the spread window. The spread quantities are displayed at their corresponding spread prices in a spread window. To illustrate this step, the spread quantities in column 712 in FIG. 7 are displayed at their corresponding spread prices. For instance, in column 712 (i.e., the ask column for the spread) there are 1 at 0.960, 3 at 0.950, 3 at 0.940, 3 at 0.930 and 1 at 0.900.

G. Determining Last Traded Price and Last Traded Quantity

In the preferred embodiments, data is computed that represents an improved calculation of an estimated last traded price at which a trader might have been able to buy or sell a spread given the current market conditions of the legs. In addition to an estimated LTP, the data may also represent an estimated last traded quantity ("estimated LTQ"). The estimated LTP and LTQ of the spread may be used by the automatic spreader, a charting tool, or any other trading related software tool. In other words, the preferred embodiments may be simply used to chart the estimated LTP and/or LTQ values of a spread, they may be used in trading the spread, or they may be used in any other manner known to one skilled in the art.

1. Using LTP/LTQ of the Legs to Calculate the LTP/LTQ of a Spread

In one embodiment, the estimated LTP and the LTQ of the spread are calculated using LTP and LTQ values received from the market data feeds for each of the legs. According to this embodiment, the following relationship may be used:

$$LTP \text{ of spread} = (LTP_{leg\,1} * m_{leg\,1}) + (LTP_{leg\,2} * m_{leg\,2}) + \ldots + (LTP_{leg\,n} * m_{leg\,n}) \quad [\text{EQN 4}]$$

$$LTQ \text{ of spread} = \text{minimum} \left( \text{abs}\left(\frac{LTQ_{leg\,1}}{\text{ratio}_{leg\,1}}\right) \text{ and } \text{abs}\left(\frac{LTQ_{leg\,2}}{\text{ratio}_{leg\,2}}\right) \ldots \text{ and } \text{abs}\left(\frac{LTQ_{leg\,n}}{\text{ratio}_{leg\,n}}\right) \right) \quad [\text{EQN 5}]$$

For example, according to FIG. 7, the first leg in column 726 has an LTQ of 1 at an LTP of 105.12, whereas the second leg in column 728 has an LTQ of 1 at an LTP of 104.23. Using the above equations, EQN 4 and EQN 5, the LTP and LTQ of the spread according to this instance may be computed:

$$LTP \text{ of spread} = (105.12_{leg1} * 1_{leg1}) + (104.23_{leg2} * -1_{leg2}) = 0.89$$

$$LTQ \text{ of spread} = \text{minimum}(abs(1_{leg1}/1_{leg1}) \text{ and } abs(1_{leg2}/-1_{leg1})) = 1$$

These values, LTP=0.89 and LTQ=1, are indicated in spread window 700 and are both evident by the LTP/LTQ indicator in column 724.

2. An Improved Spread Value Estimation

In the preferred embodiments, the LTP and LTQ estimation process employs techniques that are more consistent with a trader's strategy of buying and/or selling a spread than with conventional estimation techniques. According to one feature, the estimated LTP and LTQ computations may be triggered by any predefined event happening in any of the legs. According to another feature, the estimation process looks only to relevant pieces of market information in the legs to complete the spread. As a result of such features and others described herein or recognized by one skilled in the art, the estimated LTP and LTQ will more accurately reflect the value of the spread.

A. Spread Value Calculation

According to one aspect of the preferred embodiments, when an event occurs in one of the legs, price information is gathered from each of the legs and preferably input into EQN 6, shown directly below, to estimate the LTP of the spread. For ease of explanation, the leg that triggers the action is referred to as the event leg, while the remaining leg(s) of the spread are referred to as the non-event leg(s). Note that the relationship of EQN 6 is founded on the underlying relationship of EQN 1.

$$LTP \text{ of the spread} = m_{leg1}\text{Value}_{leg1} + m_{leg2}\text{Value}_{leg2} + \ldots + m_{legn}\text{Value}_{legn} \quad [\text{EQN 6}]$$

LTP of the spread=estimated LTP for the spread;
$m_{legn}$=spread multiplier for leg n;
$\text{Value}_{legn}$=a value for leg n; and
n=total number of legs that make up the spread.

According to an aspect of the preferred embodiments, each leg has a spread multiplier associated with it, "$m_{legn}$," that may be used to homogenize the tradeable objects. It may also be used to express the definition of the spread. While a spread may be actually defined by an exchange or a trader, this definition may be conveyed through the spread multipliers. One example way to accomplish this, with the understanding that there are numerous ways to do this, is by setting the multiplier to a positive value (+) if the leg represents a buy leg when the spread is bought or a sell leg when the spread is sold, or setting the multiplier to a negative value (−) if the leg represents a sell leg when the spread is bought or a buy leg when the spread is sold, more of which is described below. It is understood that simply multiplying a positive/negative value to the variable "$m_{legn}\text{Value}_{legn}$" results in the same outcome as using positive/negative multipliers.

According to another aspect of the preferred embodiments, any number of tradeable objects, represented by "n," may be chosen as legs of the spread. For instance, the preferred embodiments may handle any type of trading strategy including those that involve two-legged spreads (e.g., trading two tradeable objects), three-legged spreads (e.g., trading three tradeable objects), four-legged spreads (e.g., trading four tradeable objects), and so on. In the preferred embodiments, each leg may be assigned as a buy or sell leg using the positive or negative value of the multipliers described above (or through some other mechanism).

According to yet another aspect of the preferred embodiments, the term "$\text{Value}_{legn}$" relates to the price information that is gathered in each leg. The price value is a particular price in each leg used for the purposes of estimating the LTP of the spread. The price value for each leg can vary. The determination of the price value for each leg may be based on the event that took place and/or the spread definition, more of which is described below.

According to another aspect of the preferred embodiment, one or more events may be defined. As used herein, an event is an action or occurrence, often generated by a change happening in one of the legs, to which the preferred embodiments will respond. There are many different possible ways for defining an event, which will be readily apparent to one of ordinary skill in the art. Some examples are described herein with the understanding that there are numerous other possibilities. In addition, it may be possible to implement more than one event at a time to more precisely and accurately capture the value of the spread under varying circumstances.

For example, an event might include a trade happening in one of the legs, when the inside market changes, when only the best bid price or when only the best offer price changes, when a midpoint value between the best bid and the lowest offer changes, when a timer expires, or when some other item of interest, which is programmed to trigger an event, changes. For instance, if the event is defined as a trade, then the trade might be detected by either of the last traded price or the last traded quantity changing in any of the legs. If the event is defined as a change in the inside market, then the event might be detected when the inside market has changed (e.g., the best bid has changed or the best ask has changed). If the event is defined as a change to only the best bid price or only the best ask price, then the event might be detected when one of those price values changes. If the event is defined as a midpoint between the best bid price and the best ask price, then the event might be detected when the midpoint price value changes.

In one aspect of the preferred embodiments, a user can, among other things, define the spread and one or more events through a graphical user interface ("GUI"). The GUI may be located at a trader's desktop, at an administrator's desktop, or at some other location within direct or indirect communication of the system. Preferably, the parameters can be input and changed by the user. In another embodiment, setup parameters are hard-coded into software and therefore are designed to handle specific situations only. It should also be recognized that one, some or all of the various parameters may already have been chosen if, for example, an automatic spreader is utilized, and therefore they may not need to be re-entered. For instance, the legs of the spread and the multipliers might have already been input through the automatic spreader interface. As such, the system may use the same setup parameters of other software trading tools like the automatic spreader, if so desired.

In another aspect of the preferred embodiments, to assist in the efficient computation of the estimated LTP certain variables, such as the HBP, the LAP and the LTP for each leg, are preferably kept in storage (e.g., temporary buffering or long-term storage for future processing), and they are updated as new market data is received. The HBP and the LAP might be used in determining the price values, and the LTP might be used to detect that a trade has occurred. By maintaining up-to-date copies of the best prices and the last traded prices and/or quantities for each tradeable object, the estimated spread price calculation can occur more rapidly when a trigger is detected.

The LTP and LTQ estimation process may run on a laptop, workstation, gateway, router, or any other type of computer-based device. As such, there are many different possible configurations for systems of the present invention, and description of all the different possibilities would be difficult. Accordingly, some example system configurations are described, with the understanding that there are many other equivalent systems.

According to one particular embodiment, the estimated LTP and/or LTQ may be calculated at a gateway, a router, or some other intermediary computer device. Then, the LTP and/or LTQ may be calculated at the computer device and communicated to the individual terminals over a local area network or some other type of network.

According to another embodiment, the LTP and/or LTQ may be calculated at the computer that is running the autospreader or some other trading tool. For instance, a trader might be trading from his trading terminal and might wish to chart the LTP on his screen. As such, the LTP may be calculated at his trading terminal, rather than at a gateway, for example.

According to yet another embodiment, the LTP and/or LTQ may be calculated by a computer at the exchange or at some other remote location. For instance, an exchange may wish to compute the LTP and/or LTQ for its subscribing traders. If so, they may simply calculate the values and disseminate the information in their data feeds to the traders.

B. Function and Operation

According to the preferred embodiments, when an event occurs in a particular leg, it preferably triggers a process for estimating the LTP of the spread. Next, the preferred embodiments determine if certain conditions are met (if there are any), such as if the market data is live and up-to-date. If the conditions are met, then the preferred embodiments proceed by computing the LTP and/or LTQ of the spread. Of course, alternate implementations are included within the scope of the preferred embodiments in which functions may be executed out of order from that shown or discussed, including substantially concurrently or in reverse order, depending on the functionality involved, as would be understood by those of ordinary skill in the art.

In one aspect of the preferred embodiments, conditions may be programmed by the user and these programmed conditions are preferably met before the computation process begins. If conditions are not programmed, the preferred embodiments may simply skip this step and move onto the estimation process. Some examples, which are not meant to be exhaustive, are given directly below to illustrate to the reader other possible conditions.

One particular condition may be whether the market data received for each of the legs is valid. For instance, one way to determine market data validity is to verify that the market data for each leg is live and up-to-date. In other words, sometimes an electronic market is not always open or running, especially at the beginning or end of a trading day as markets may open at different times and in different time zones. Thus, the preferred embodiments might determine whether the markets are open before estimating the LTP of the spread. They may do this in a variety of ways including looking at time stamps of the market data and comparing the time stamps to the current time.

Another particular condition may be when certain criteria programmed by the trader are met. For instance, a trader might only be interested in computing the LTP of the spread when the average traded volume in each leg is above a certain threshold. According to this instance, the preferred embodiments might only start the process when the average traded volume in each leg is above the threshold. In yet another example, a trader might be interested in computing the LTP of the spread only during certain times of a trading day. For instance, the trader might want to trade a spread based on a European market and a U.S. market, and both markets might only be live during a particular time of the day. As such, the trader could input the time that the two markets are live and overlap each other, and during only that block of time will the estimation process proceed. It is also understood that the conditions could be checked prior to detecting a trigger. For instance, a condition could also be simply turning the present feature "on" or "off."

It is understood that even though certain conditions have not been met, various values needed in the estimation process may still be watched and stored. As indicated above, to assist in the efficient computation of the estimated LTP certain variables, such as the HBP, the LAP, and the LTP for each leg, may be kept in storage, and they are updated as new market data is received. As such, these values may be continuously stored and updated for the leg(s) that have met the conditions, so that when one or more conditions are met in the other leg(s), the estimation process can proceed in an accurate and efficient manner.

Once the event has triggered and any programmed conditions have been met, the preferred embodiments proceed with the estimation process. As indicated earlier, the determination of the price value for each leg may be based on the event that took place and/or the spread definition. In other words, the system preferably infers what happened in the event leg. For instance, the system might infer that the event leg was either bought or sold. Using that information and the spread definition, the system preferably selects the corresponding side on the non-event leg(s). Then, the appropriate price information is gathered from the legs and the LTP of the spread is estimated.

Table 1, shown directly below, illustrates some example events and how the preferred system might characterize the event leg as either bought or sold. Of course, it is understood that there are a number of different ways to characterize each event and that there exists a number of different events.

TABLE 1

| Example # | Example Event | Example Characterization of the Event Leg |
|---|---|---|
| 1 | Traded price at or below the HBP in a leg | The event leg is "bought" |
| 2 | Traded price at or above the LAP in a leg | The event leg is "sold" |
| 3 | Traded price between the HBP and LAP in a leg | The event leg is "bought" if traded price is closer to the HBP and the leg is "sold" if traded price is closer to the LAP |
| 4 | Traded price is directly between HBP and LAP in a leg | May be programmed as the event leg being "bought" or "sold" |
| 5 | The best bid price changes in a leg | The event leg is "bought" |
| 6 | The best offer price changes in a leg | The event leg is "sold" |
| 7 | The midpoint value changes in a leg | May be programmed as the event leg being "bought" or "sold" |

Once the event leg is characterized, the preferred system may select the corresponding side on the non-event legs and gather the appropriate information to compute the LTP of the spread. For instance, if a non-event leg is to be bought, then the price value equals the LAP of that leg, because that represents the lowest price someone is offering to sell the tradeable object. In another instance, if a non-event leg is to be sold, then the price value equals the HBP of that leg, because that represents the highest price at which someone is offering to buy the tradeable object. Once the price values for each leg are determined, they can be input into EQN 6, shown above, to estimate the LTP of the spread. If so desired, the LTQ may also be estimated by using the minimum quantity available at the various price values or by using a weighted average determination, more of which is described below.

Table 2, shown directly below, provides some working examples that illustrate several price value determinations for event legs and non-event legs, which may be used in estimating the value of a particular three-legged spread. In particular, the price value determinations are based on how the system infers what happened in the event leg. As shown, leg 1 represents a buy leg, leg 2 represents a sell leg, and leg 3 represents a buy leg. In the interest of clarity, the event is defined as a trade, although any event may be defined.

that leg 1 was bought (e.g., using Table 1), and therefore, the preferred system selects the sell side of leg 2 (sell at HBP in leg 2 and the buy side of leg 3 (buy at LAP in leg 3). However, notice that example 3 in Table 1 shows that the preferred system infers that leg 1 was sold (e.g., using Table 1), and as a result, different information is gathered in legs 2 and 3. In particular, the preferred system selects the buy side of leg 2 (buy at LAP in leg 2) and the sell side of leg 3 (sell at HBP in leg 3).

FIG. 7 shows another working example where the event is defined as a trade. This example includes two legs, the first leg is a buy leg and the second leg is a sell leg (similar to the example spread defined in Table 1 without leg 3). There was a trade in the first leg represented by a change in the LTQ. The LTQ in the first leg is 1 at a LTP price of 105.12, which is shown in column 726, and represents the HBP of leg 1. Accordingly, the LTQ of the spread is the maximum number of spread units that can be filled with an offsetting sale in the second leg at 104.23 (the HBP in the second leg, because the spread was defined earlier as buy leg 1 (+) and sell leg 2 (−)). In this example, the LTQ of the spread equals 1 because the multipliers are 1 for the first leg and −1 for the second leg and there is a quantity of 1 at 104.23, which is shown in column 728. Using equation EQN 6, described above, the LTP of the spread can be calculated using the following relationship:

$$LTP \text{ of spread} = (1*105.12) + (-1*104.23) = 0.89$$

In this particular example, the method results in the same estimated LTP of the spread as using the LTQ in the second

TABLE 2

| Example | Leg 1 (Buy Leg; +) | Leg 2 (Sell Leg; −) | Leg 3 (Buy Leg; +) |
|---|---|---|---|
| 1 | Event: Leg 1 was bought; $Value_{leg1}$ = traded price | $Value_{leg2}$ = HBP (leg 2) | $Value_{leg3}$ = LAP of leg 3 |
| 2 | $Value_{leg1}$ = LAP of leg 1 | Event: Leg 2 was sold; $Value_{leg2}$ = traded price | $Value_{leg3}$ = LAP of leg 3 |
| 3 | Event: Leg 1 was sold; $Value_{leg1}$ = traded price | $Value_{leg2}$ = LAP (leg 2) (inverse sign) | $Value_{leg3}$ = HBP (leg 3) (inverse sign) |

Referring to Table 2, example 1 shows that leg 1 was bought, and therefore, information is gathered from legs 2 and 3 accordingly. In other words, the preferred system the infers leg, but this will not necessarily occur in other situations when the LTQ in the second leg does not equal the HBP or when the triggering event is defined as something other than a trade.

In some instances, there may not be enough quantity in one of the legs to complete an offsetting order. For instance, there might not be enough quantity at the HBP in a leg to create at least one spread unit. Then, preferably, the system would look to the quantity at the next best bid (next best bid=HBP−one price level) and continue to do so until there is enough quantity to fill one spread unit. In this instance, the LTQ would equal 1 and the price value of the leg would be calculated using the weighted average of the various prices in the leg needed to fill that quantity. Similarly, there might not be enough quantity at the LAP in a leg to create at least one spread unit. Then, the system would look to the quantity at the next best offer and continue to do so until there is enough quantity to fill one spread unit.

According to an aspect of the preferred embodiments, a trader may wish to track multiple estimations for the LTP of the spread. To do so, the trader may designate which events to track such as a trade, the best bid price changing, the best ask price changing, or the midpoint changing or some other defined event. Accordingly, all of the estimated LTPs of the spread may be used independently or they may be combined in some fashion, such as taking an average of the group. For instance, a trader might want to track the events associated with a change in highest bid prices across all of the legs, in addition to the events associated with a change in the lowest bid prices across all of the legs. By doing so, the price values for each event might differ slightly and give the trader a different perspective of the way the spread is valued. On the other hand, the estimated LTPs could be averaged, if so desired.

C. Using the Spread Value Estimations

The computed values are preferably communicated to a trading tool such as the autospreader, a charting tool, an automated trading tool, and/or a semi-automated trading tool, for its intended use.

In one embodiment, once the estimated LTP and/or LTQ are calculated, it is indicated on the spread window only when at least one spread unit is available. For example, referring to FIG. 7, the LTQ is shown in column 724 when at least one spread unit is available. Alternatively, an LTQ of zero is displayed when there are spreads available but not enough to complete a full spread unit. Although FIG. 7 illustrates an LTQ in integer form, it should also be understood that the spread units could instead be displayed in decimal form.

Note also that the estimated LTP and/or LTQ of the spread can be calculated and/or displayed based on any unit scale that the user chooses. For example, it can be calculated and displayed in spread units (corresponding to the exact spread ratios set by the trader) or it can be calculated and displayed based on the lowest common denominator of the spread ratios or it can be calculated and displayed based on any other spread ratio. For example, assume that a trader sets the spread ratios of a two-legged spread to be 100 for the first leg and −70 for the second leg, and assume also that the LTQ for the first leg was a buy of 100 and there is 70 available in the bid depth of the second leg. Then, according to this example, if the trader selects to use spread units, the LTQ of the spread would be displayed as a 1, but if the trader selects to use the highest common integer factor, the LTQ of the spread would be displayed as 10 (because the highest common integer factor of the 100/70 spread is 10).

Furthermore, in another embodiment, color-coding or other indicators may be utilized to indicate to the trader intra-spread unit variations in the LTQ. For example, the automatic spreader can be programmed to display the LTQ in various shades of color (e.g., ranging from white to green) to indicate increments of a spread unit.

Figure 17:
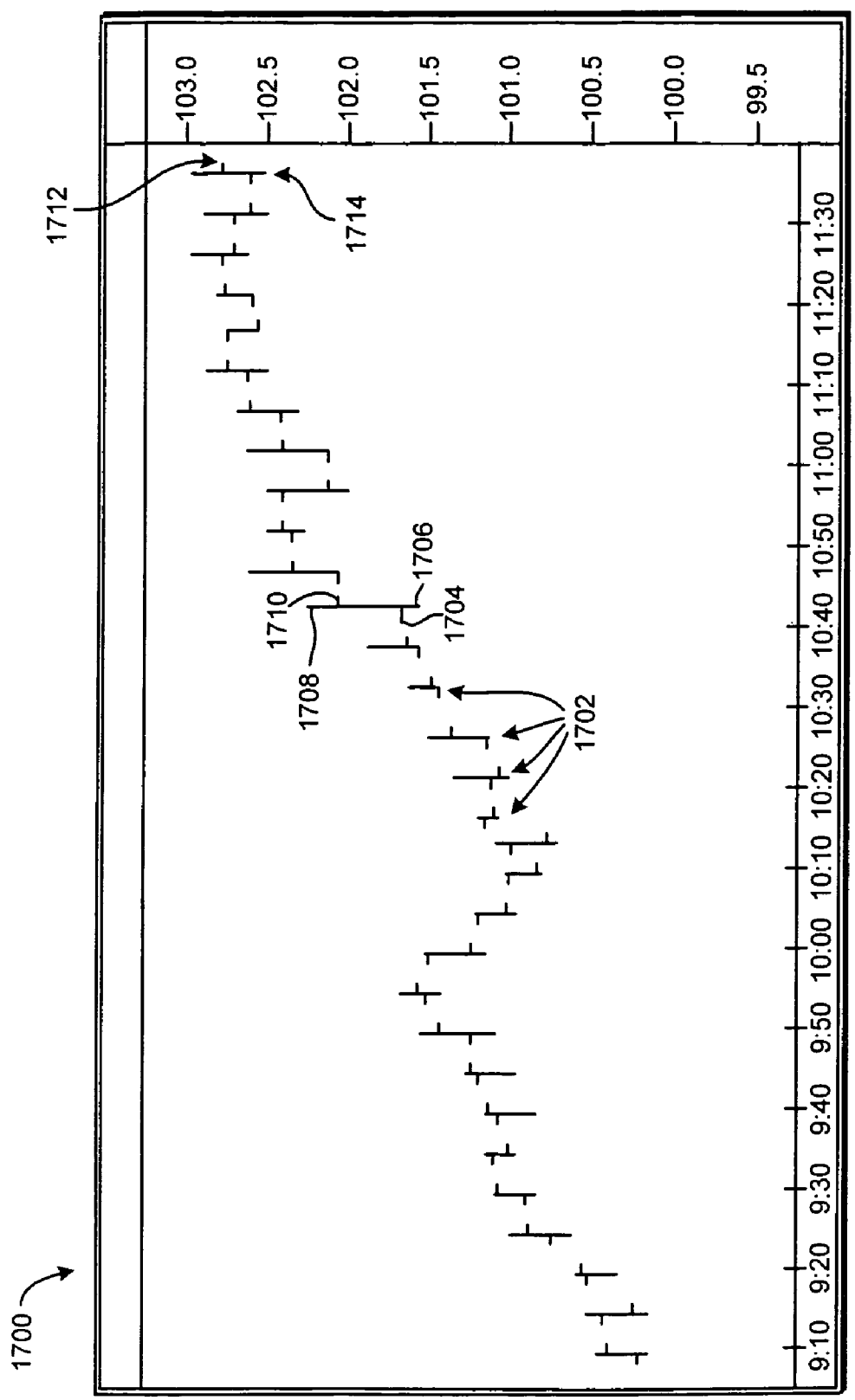
FIG. 17 illustrates an example screen display of last traded price information that is estimated in accordance with the preferred embodiments.
Figure 10:
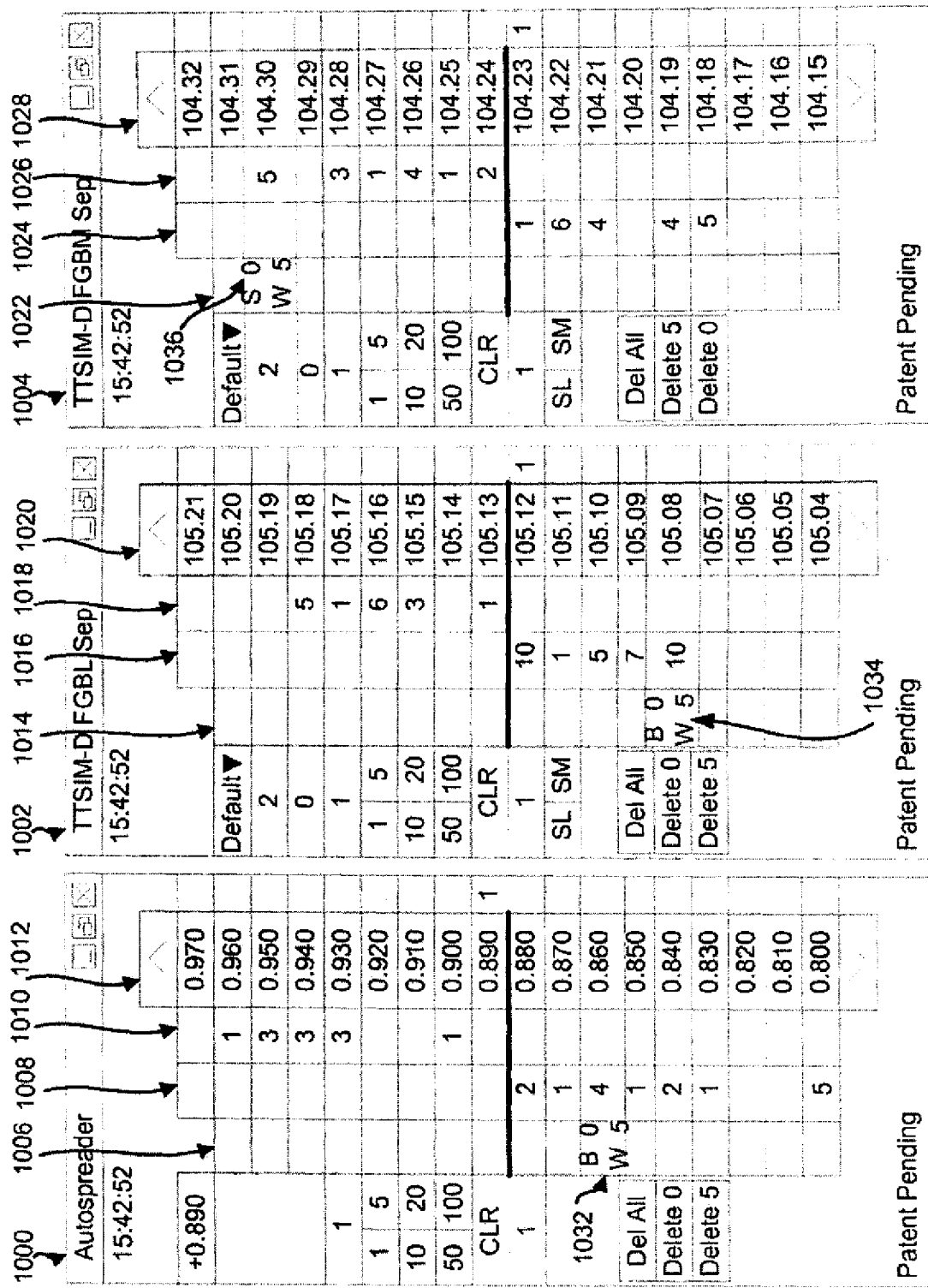

In yet another embodiment, the estimated LTP and/or LTQ can be formatted into a chart for viewing by a trader. FIG. 17 illustrates an example screen display 1700 of data that is output from an example trading tool, such as in a chart or in some other display or data feed. While this example embodiment uses screen display 1700 to convey price activity, other types of charts may be used. Nonetheless, according to screen display 1700, four elements make up price bar 1702: the open 1704, low 1706, high 1708, and close 1710 for a given range of time. A price bar 1702 can represent any range of time the user wishes, for example, from five-seconds to one-year. The total vertical height (e.g., from low 1706 to high 1708) of the bar represents the entire trading range for the period, that is, the top of the bar represents the highest price of the period, and the bottom of the bar represents the lowest price of the period. The open 1704 may be represented by a small dash to the left of the bar, and the close 1710 for the session may be a small dash to the right of the bar. The close 1712 on the currently active bar 1714 preferably moves up and down in real-time until the time interval associated with bar 1714 expires. Once the interval expires, the close 1712 stays fixed relative to its associated bar, which in this example is bar 1714. A new currently active bar (not shown) is started and displayed.

As shown in FIG. 17, when an event occurs in one of the tradeable objects, such as a trade has occurred, it triggers a calculation that outputs a price value, which is plotted on display 1700 to form the price bars 1702. The process of detecting an event, calculating a price value, and plotting the value on the display 1700 may continue throughout the trading session.

In yet another embodiment, the LTP and/or LTQ can be fed into an automated or semi-automated trading tool for use in executing a particular trading strategy.

H. Trading in the Spread Window

Using one or more of the techniques described above, the automatic spreader can generate and display a spread window and its corresponding leg windows, per step 108 of the flowchart 100 in FIG. 1. In the preferred embodiment, the spread window displays both the spread price (e.g., using EQN 1 and EQN 2) and the total quantity traded (e.g., using EQN 3 and EQN 4) at that spread price, although more or fewer items of interest may be displayed such as the LTP/LTQ (e.g., using EQN 4 and EQN 5).

At step 110 in FIG. 1, once the spread window is displayed, a user can enter an order(s) that has quantity at a specified price. The user may enter the order(s) in the spread window by a click of a mouse, or by any other input device, such as a keyboard, light pen, or a variety of other means. Using the ongoing example presented above with respect to FIGS. 6 and 7, this section describes how the automatic spreader facilitates the trading of a spread once the order has been entered.

Figure 10:
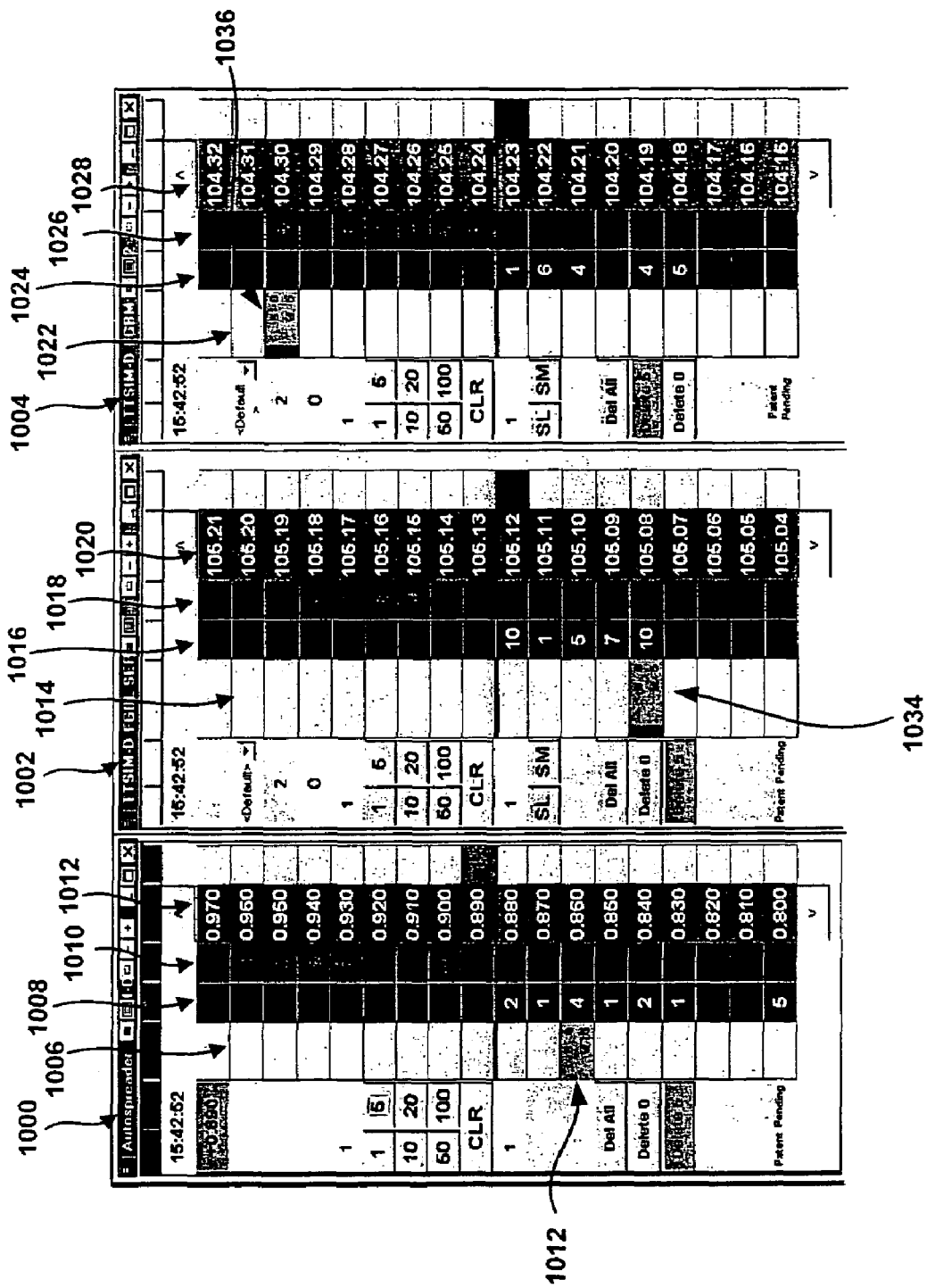
FIG. 10 is substantially similar to FIG. 7, except that it shows an entered order in the spread window and shows the corresponding working orders in the legs.

FIG. 10 is substantially similar to FIG. 7, except that it shows an entered order 1032 to buy 5 of the spread at a price of 0.860 in the spread window 1000 and shows the corresponding working orders 1034, 1036 automatically entered by the automatic spreader. That is, a buy order 1034 was quoted in leg window 1002 and a sell order 1036 was quoted in leg window 1004. FIG. 10 illustrates an example of quoting both legs of the spread, but alternatively, the automatic spreader can quote only one of the legs, or more than two legs. How many legs the automatic spreader quotes preferably depend on the user's spread setting parameters. In any instance, the method for quoting any number of legs preferably remains the same.

Referring back to the configuration window 600 in FIG. 6, the user can preferably select the appropriate spread setting parameters to quote one or more legs of the spread. That is, by selecting any one of the "Active Quoting" fields 620 corresponding to the underlying leg, the automatic spreader will automatically quote the selected leg based on information from the other legs, the order, and the user's preferences (e.g., multiplier, spread ratio, etc.). For example, by only selecting the "Active Quoting" field for leg A, the automatic spreader will quote only leg A first. The same is true quoting leg B, or any other leg underlying the spread. In another example, by selecting the "Active Quoting" field for both legs A and B, the spreader will quote both legs (this example is shown in FIG. 6). Again, regardless of whether one or more legs are quoted, in the preferred embodiment, the same calculation applies to determine where to place the quote in the leg(s). An example of which is provided below.

I. Determining Where to Quote

In a preferred embodiment, at the instant of placing an order in the spread window, the automatic spreader determines where to quote one or more legs of the spread.

Figure 11:
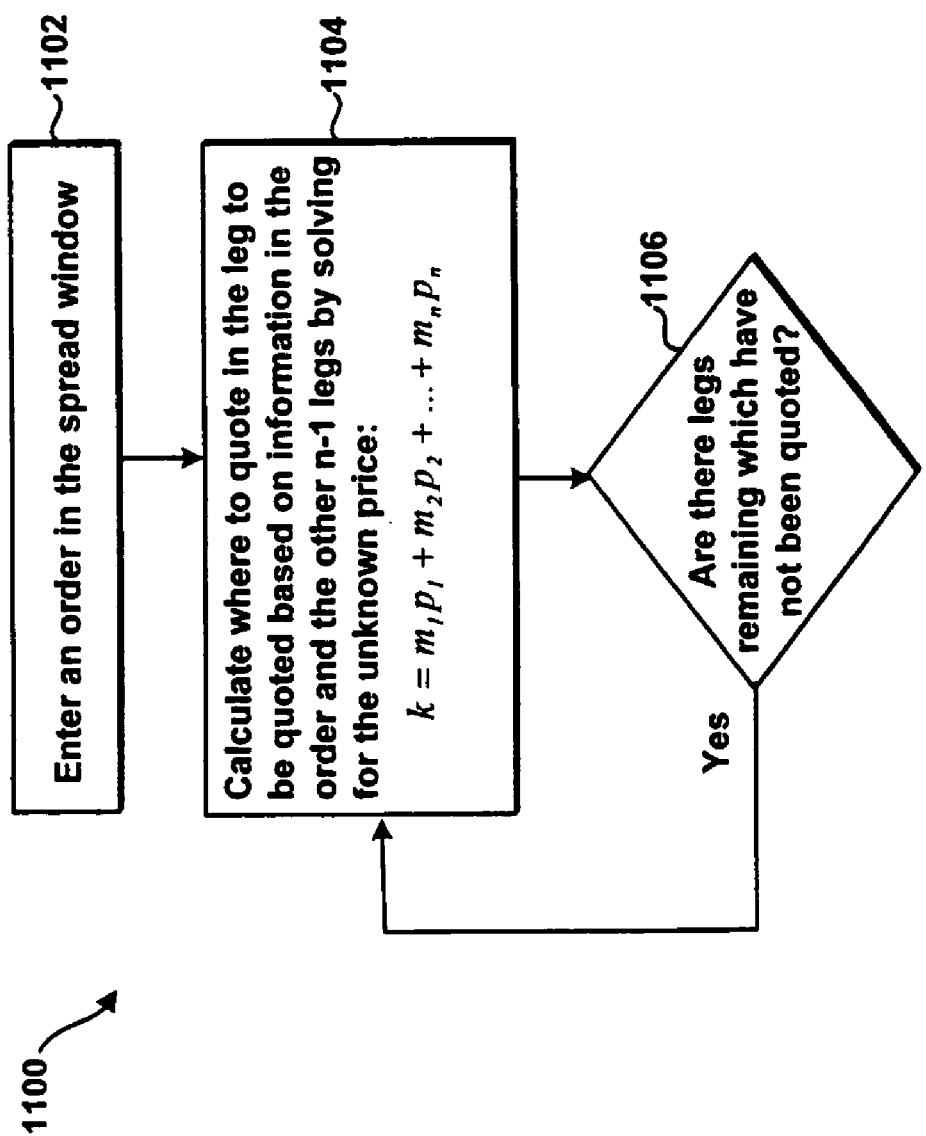
FIG. 11 shows a flowchart that illustrates a method of quoting in the legs.

FIG. 11 shows a flowchart 1100 that illustrates a method of quoting a leg of a spread. The illustrated method can accommodate any number of legs, and the method of quoting one, some, or all of the legs preferably remain the same. However, it should be understood that more or fewer steps, in the same or different order, might be included in the flowchart 1100 to obtain similar results. For the sake of simplicity, the method in FIG. 11 is illustrated using the two-legged spread example first laid out with respect to FIGS. 6, 7, and 10. Then, looking to FIG. 10, it is visually apparent that a trader has entered an order to buy 5 lots of the spread at a price of 0.860, per step 1102. This working order is shown in column 1006.

At step 1104, the automatic spreader quotes a leg based on information from the entered order, information from the other n−1 legs, and the user's preferences. In a preferred embodiment, the automatic spreader starts by looking to the inside market of the legs of the spread. In particular, it looks to the highest bid price (HBP) with quantity in a legs for which a quote to sell will be needed for this order and it also looks to the lowest ask price (LAP) in those legs for which a quote to buy will be needed. In this example, the order is to buy the spread, so in the preferred embodiment, the automatic spreader will be looking to sell at the HBP in the sell legs and will be looking to buy at the LAP in the buy legs. Recall that the user can select which legs are buy legs and sell legs by entering a positive or negative ratio.

Referring back to this example, the first leg is quoted based on information from the second leg. Looking to the second leg (i.e., a sell leg), there is a buy quantity of 1 in column 1024 at the HBP price of 104.23 in column 1028. However, when there is not enough quantity at that level to fill an offsetting order, the software preferably looks to the next highest bid price (or next lowest sell price depending on if it is a buy) in that leg and continues to do so until it finds enough quantity.

In one embodiment, once enough offsetting quantity is found, the automatic spreader uses the lowest bid price (or the highest sell price depending on if it is a buy) of the quantity used. To illustrate this embodiment, referring to FIG. 10, the quantity needed to offset the buy order is 5. However, the buy quantity of 1 in column 1024 at 104.23 is not enough to offset the user's buy order of 5. Thus, in this embodiment, the automatic spreader looks to the next level of quantity to supplement the buy quantity of 1, and in this example, finds a buy quantity of 6 in column 1024 at 104.22. As a result, the buy quantity of 1 plus 4 of the buy quantity of 6 may be used to offset the buy order of 5. According to this embodiment, the price for the second leg is 104.22.

At step 1104, the price at which to quote in the first leg can be calculated using either EQN 1 or EQN 2.

$$k = m_{leg1} p_{leg1} + m_{leg2} p_{leg2} + \ldots + m_{legn} p_{legn},$$

$$k=0.860; n=2; m_1=1; m_2=-1; p_2=104.22;$$
$$p_1 = \text{unknown}$$

Solving for the unknown price to quote the first leg, $p_1 = 105.08$. Therefore, a buy order of 5 is entered in the first leg in column 1014 at a price of 105.08 in column 1020. This is evidenced by the illustration of a buy order 1034 in the working order column 1014 of the first leg shown in window 1002.

In another embodiment, once enough offsetting quantity is found, the software can instead calculate the weighted average of prices for that quantity.

Figure 12:
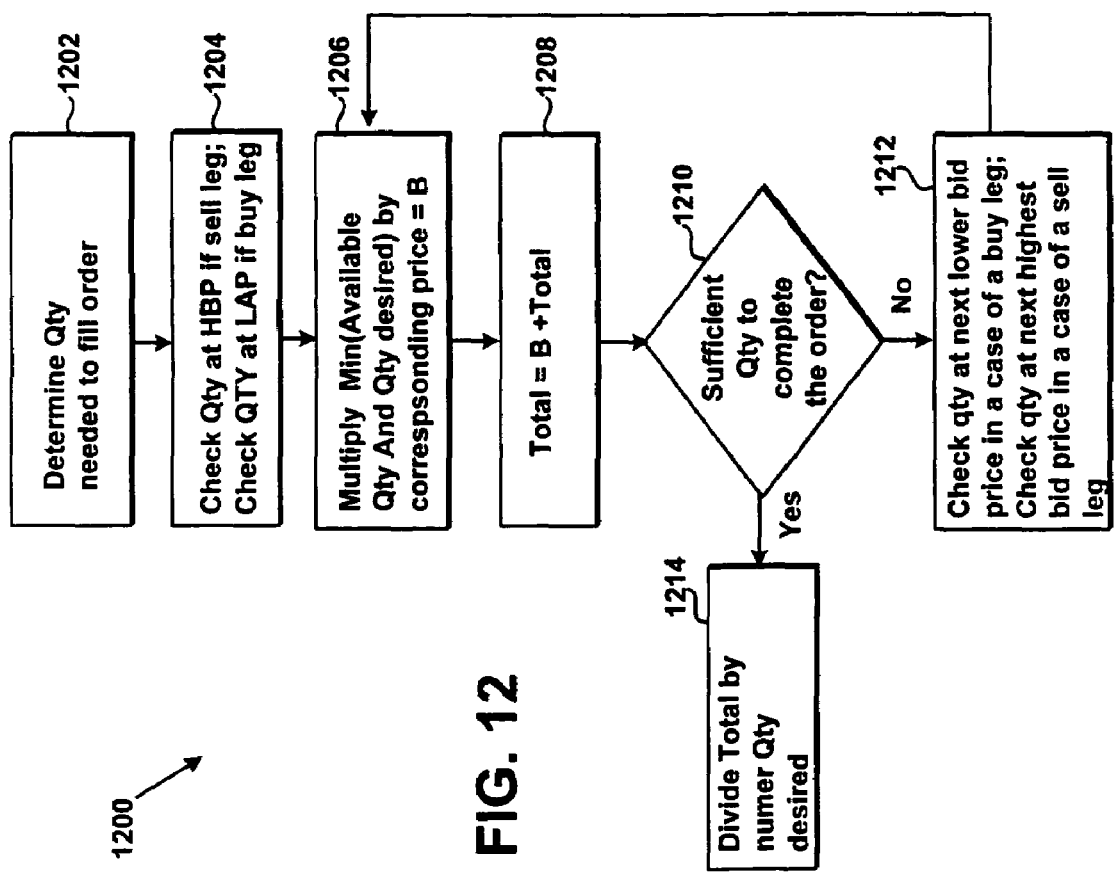
FIG. 12 shows a flowchart that further illustrates how the automatic spreader may calculate where to quote in the legs.

FIG. 12 shows a flowchart 1200 to better illustrate how the automatic spreader can calculate a price in an offsetting order using the weighted average of prices, if necessary. Although the flowchart 1200 can accommodate any number of legs, it is illustrated using the ongoing example from FIG. 10. It should be understood, however, that the flowchart 1200 provides only an illustration of how to calculate the weighted average price, and therefore the present invention should not be limited to the steps, or orders of the steps, shown in the figure.

At step 1202, the quantity needed to fill the order is determined. In this example, the quantity needed to offset the buy order is 5. This value is known from the entered buy order and from the spread ratios. Note that a trader can enter a sell order, whichever is desired.

At step 1204, the quantity at the LAP in the first leg or the quantity at the HBP in the second leg is determined (or in other n−1 legs, if necessary) depending on the entered order. In this example, the trader entered an order to buy the spread, so to determine where enter an order in the buy leg(s) (in this example, the buy leg is the first leg), the automatic spreader preferably determines where it would currently be possible to fill an offset order by looking at the HBP price in the sell leg. In the ongoing example, a quantity of 1 in column 1024 at the HBP price of 104:23 is shown in column 1028.

At step 1206, a value used in determining the weighted average of prices is found at that quantity, so using a general variable, B, the price determined at that quantity can be calculated: B=(1)(104.23)=104.23. The variable, B, represents the actual price multiplied by the most recent quantity determined in step 1204.

At step 1208, another general variable, Total, is calculated to be used in the weighted average price: Total=B+Total (initially, total=0)=104.23+0=104.23. The variable, Total, represents a running total of B in step 1206.

At step 1210, it is determined whether there is sufficient quantity to offset the order, in this example, a quantity of 4 more is needed (5−1=4).

At step 1212, the next lower price level from the HBP is determined (or a next higher level from the LAP, if used), which is a quantity of 6 in column 1024 at price of 104.22 in column 1028. This value will be used in step 1206.

At step 1206, the remaining quantity of 4 is needed (determined from step 1210), so B=(4)(104.22)=416.88.

At step 1208, Total=B+Total=416.88+104.23=521.11.

At step 1210, it is determined that there is sufficient quantity to complete the order (i.e., a quantity of 6 is available in column 1024 at a price of 104.22 in column 1028, however only a quantity of 4 is needed to offset the order).

At step 1214, Total is divided by the total number of quantity included in the order, which is 5. Thus, Total/5=(521.11)/5=104.222. Therefore, the weighted average for the price in the second leg is $p_2 = 104.222$.

Referring back to FIG. 11, at step 1104, the price at which to quote in the first leg can be calculated using either EQN 1 or EQN 2.

$$k = m_{leg1} p_{leg1} + m_{leg2} p_{leg2} + \ldots + m_{legn} p_{legn},$$

$$k=0.860; n=2; m_1=1; m_2=-1; p_2=104.222;$$
$$p_1 = \text{unknown}$$

Solving for the unknown price to quote the first leg, $p_1=105.08$ (105.082 rounded down) (Note that due to rounding, the weighted average approach results in the same price as with the previous approach, however, this may not always be true.)

At step 1106 in FIG. 11, it is determined whether there are any legs which remain to be quoted. The steps 1104 and 1106 are repeated until all of the legs have been quoted.

Continuing with the example in FIGS. 6, 7 and 10, the second leg is also quoted.

Therefore, the automatic spreader will place an order to sell 5 in the second leg, using information from the first leg. The automatic spreader starts by looking to the inside market of the first leg, and in particular, looks to the lowest ask price (LAP) with quantity, which in this example is a quantity of 1 in column 1018 at a price of 105.13 in column 1020.

As described above, in one embodiment, once enough offsetting quantity is found, the automatic spreader can use the lowest bid price (or the highest sell price depending on if it is a buy) of the quantity used. Again, the quantity needed to offset the order is 5. However, the ask quantity of 1 in column 1018 at 105.13 is not enough to offset the order of 5. Thus, the automatic spreader looks to the next level of quantity to supplement the ask quantity of 1, and in this example, finds an ask quantity of 3 in column 1024 at 104.22 and a ask quantity of 6 in column 1024 at 105.16. As a result, the buy quantity of 1 plus 3 plus 1 of the ask quantity of 6 may be used to offset the order of 5. According to this embodiment, the price for the first leg is 105.16.

At step, 1104, it is determined where to quote the second leg, preferably this step uses the same equation as the first leg:

$$k = m_{leg1} p_{leg1} + m_{leg2} p_{leg2} + \ldots + m_{legn} p_{legn},$$

$$k=0.860; n=2; m_1=1; m_2=-1; p_2=\text{unknown};$$
$$p_1=105.16$$

Solving for the price to quote in the second leg, $p_2=104.30$.

Therefore, a sell order 1036 of 5 in column 1022 is entered in the second leg at 104.30 in column 1028. This is evidenced by the entered sell order 1036 in FIG. 10.

Alternatively, finding the weighted average of prices of the quantity needed for an offsetting order can instead be calculated:

$$p1 = ((1*105.13)+(3*105.15)+(1*105.16))/5 = 105.148.$$

Thus, p1=105.148.

At step, 1104, it is determined where to quote the second leg, preferably this step uses the same equation as the first leg:

$$k = m_{leg1} p_{leg1} + m_{leg2} p_{leg2} + \ldots + m_{legn} p_{legn},$$

$$k=0.860; n=2; m_1=1; m_2=-1; p_2=\text{unknown};$$
$$p_1=105.148$$

Solving for the price to quote in the second leg, $p_2=104.29$ (104.288 rounded up).

Therefore, a sell order 1036 of 5 in column 1022 could be entered in the second leg at 104.29 in column 1028 (not shown).

This process continues until all of the legs are quoted.

In the preferred embodiment, the user may instead select to have the automatic spreader quote only based on the inside market prices by unselecting the "Adjust For Market Depth" icon in a spread configuration window for any given leg. Using the above example, if this option was unselected, then when quoting the first leg, $\text{price}_{leg2}$ would have been set at 104.23. The offsetting order on the first leg would have been entered, then, at $$\text{spread price} = (\text{price}_{leg1} * m_{leg1}) + (\text{price}_{leg2} * m_{leg2})$$

spread price=0.860;
$m_{leg1}=1$;
$m_{leg2}=-1$;
$\text{price}_{leg1}=\text{unknown}$
$\text{prices}_{leg2}=104.23$ then, plugging in the known values into EQN 1 or EQN 2 gives:

$$0.860 = (\text{price})(1) + (104.23)(-1),$$
$$\text{where price}_{leg1}=105.09.$$

Similarly, for quoting the second leg, $\text{price}_{leg1}$ would have been set at 105.13 and the offsetting order on the second leg would have been entered at 104.27.

Regardless of which method is used to quote a leg, the automatic spreader preferably determines if there is enough quantity to complete an offsetting order before an order is entered. In the examples above, there was enough quantity to complete the offsetting order and thus the automatic spreader allowed the entering of the buy order in the spread. Preferably, the automatic spreader allows a trader to select how to enter orders when there is not enough quantity to complete the order, but alternatively, the automatic spreader could be programmed on how to enter orders when there is not enough quantity to complete the order. In a preferred embodiment, when there is not enough quantity to complete the offsetting order, the automatic spreader does not allow the order (i.e., to buy or sell the spread) to be entered at that time, and preferably advises the trader that there is not enough quantity to complete the order. The trader can change his or her order accordingly. In another preferred embodiment, when only a fraction of the offsetting order can be completed, the automatic spreader will allow an order for only the fraction available and advise that the order could not be entered for the remaining portion of the order. For example, assume that a trader has attempted to enter an order to buy 30, but only 10 was available at that time, then in this embodiment, the automatic spreader would enter an order to buy 10, and advise the trader that the remaining 20 could not be entered. In yet another preferred embodiment, if there was enough quantity at the time the order was entered, but the quantity changed and now there is not enough quantity to complete the order, the automatic spreader can delete the order or part of the order, if possible. Alternatively, the automatic spreader can be programmed to look for more quantity than is needed to complete an offsetting order before an order is entered to operate as a protective mechanism that would increase the likelihood that an offset will get filled. There are many other ways in which the automatic spread may allow orders to be entered or not entered, depending on available quantities in the market and the invention is not limited to any particular approach.

J. Re-Pricing of Quotes

At this point, a user has already entered an order. As the markets for each leg move, the price levels of the working orders in the legs need to change in order to maintain the spread level being sought by the trader. Preferably, the automatic spreader automatically moves the working orders in the legs accordingly. A trader may want to limit the number of times the automatic spreader re-quotes the legs. This may desirably reduce the chances of losing a trader's spot in the queue at the exchange, or may reduce the charges for submitting orders at an exchange, etc. Thus, in the preferred embodiment, the automatic spreader allows an acceptable range of prices to change before the automatic spreader re-prices the order into the legs. Therefore, if the market has moved, but is still within the acceptable range set by the user, the working orders in the legs will not be moved. Accordingly, if a working order is filled the actual price that the trader purchased or sold the spread at may be different (within the acceptable range set by the trader) from the price of the spread at which the trader originally entered the order.

This acceptable range is defined by variables that are referred to herein as "slop". Generally, slop is a number based on units of change in whatever denomination the prices of the spread are calculated A preferred embodiment uses values for both an 'inside' and an 'outside' slop. As described herein, the inside slop value generally defines the worst price (the highest in the case of spread bid and the lowest in the case of a spread offer) a user is willing to accept for a spread, and the outside slop generally defines the best price (the lowest in the case of a spread bid and the highest in the case of a spread offer) the user is willing to accept for a spread. Referring back to the spread configuration window 600 in FIG. 6, the slop variables can be set by the user with 'Inside Slop' and 'Outside Slop' fields 608 and 610. In the preferred embodiment, a slop value of 0 indicates that the slop range is zero, and more specifically, that the legs will be re-quoted every time the market prices in the legs move. The larger the slop value, the larger the slop range will be, which allows for more market fluctuation before the automatic spreader re-quotes the legs.

As previously described above, using slop, the spreader will change the price levels of working orders in the legs when the working spread changes such that it is out of the range between the inner and outer prices. Whenever market prices change, a trader's working spread orders are preferably checked against the trader's desired spread price for price validity (e.g., whether or not they are within the slop settings).

For spread bid: Inner Price=Target Price+Inside Slop [EQN 6]

Outer Price=Target Price−Outside Slop [EQN 7]

If Outer Price <=Working Price <=Inner Price, then the working orders in the legs may be unchanged. Otherwise, working orders may be re-calculated and re-entered pursuant to the quoting algorithms described above.

For spread offer: Inner Price=Target Price−Inside Slop [EQN 8]

Outer Price=Target Price+Outside Slop [EQN 9]

If Inner Price <=Working Price<=Outer Price, then the working orders in the legs may be unchanged. Otherwise, working orders may be re-calculated and re-entered pursuant to the quoting algorithms described above.

In the calculations above, the 'working price' is the trader's working spread price based on the current markets in the legs. The working price starts equal to the user's target or desired price, and moves up and down in price as the market fluctuates. The 'target price' is the desired price of the trader's spread order entered in the spread window. The 'inner price' and 'outer price' are the prices that form the slop range that are preferably set by the user. Below are two examples that further illustrate slop and the automatic re-pricing mechanism.

1. EXAMPLE 1

Re-Pricing

Figure 13:
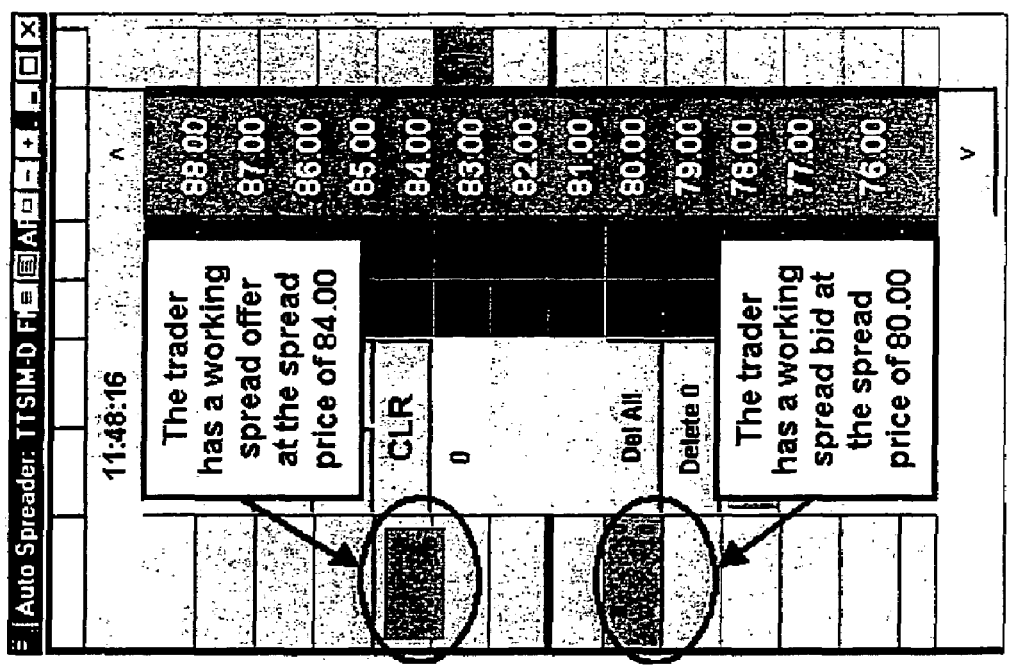
FIG. 13 shows a spread window having a working offer spread order and a working bid spread order.

FIG. 13 shows a spread window 1300 for this example. Assume that a trader has working spread orders at a bid price of 80.00 and an offer price of 84.00. If this example involves a two-legged spread, the spread bid corresponds to a bid in a first leg and an offer in a second leg. Similarly, the spread offer corresponds to an offer in the first leg and a bid in the second leg.

Assuming that both the inside and outside slop settings in the spread configuration window were set to 5, the spread range for the offer would be between the prices of 79.00 and 89.00 and the spread range for the bid would be between the prices of 75.00 and 85.00. According to this example, the working spread range values are calculated as follows:

For the spread bid: Inner Price=80.00+5=85.00

Outer Price=80.00−5=75.00

For the spread offer: Inner Price=84.00−5=79.00

Outer Price=84.00+5=89.00

Figure 14:
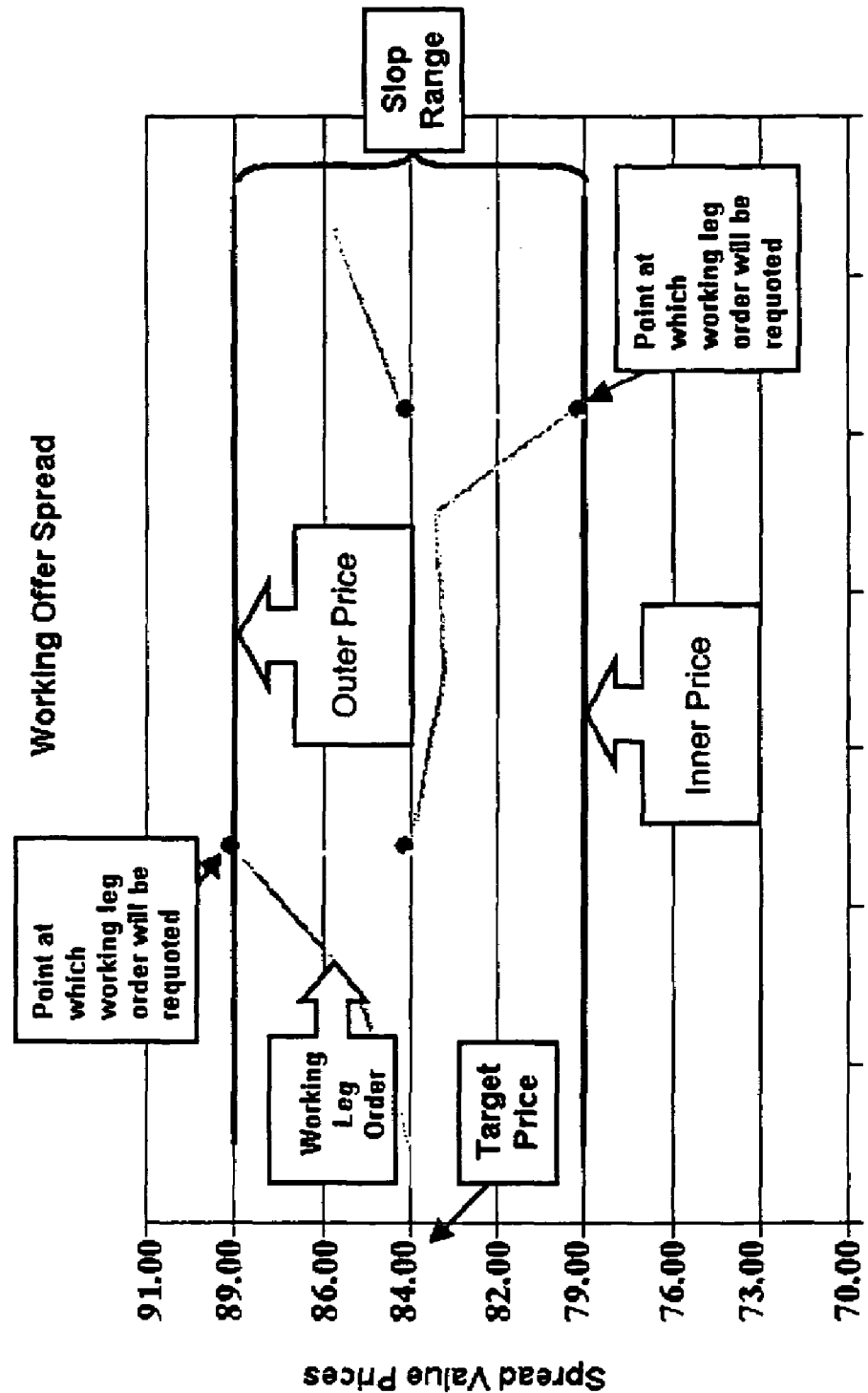
FIG. 14 shows an example of a boundary applied to the working offer spread order for the example of FIG. 13.

FIG. 14 shows a graph illustrating the working offer spread for this example. The target price is 84.00 and the slop range is between 79.00 and 89.00. The prices at which the working orders in the legs are quoted only change when the working spread price crosses either the outer price designation or the inner price designation. Thus, an order might not be filled at the original order price of 84.00, but at a price within the slop range of 79.00-89.00. It should be understood that the invention is not limited to this exact use of inside or outside slop and is not limited to triggering a change in the working orders based on the working price crossing either the inner or outer price designations. For example, alternatively the working orders can be re-priced if the working spread price reaches either the outer or inner price designations.

Figure 15:
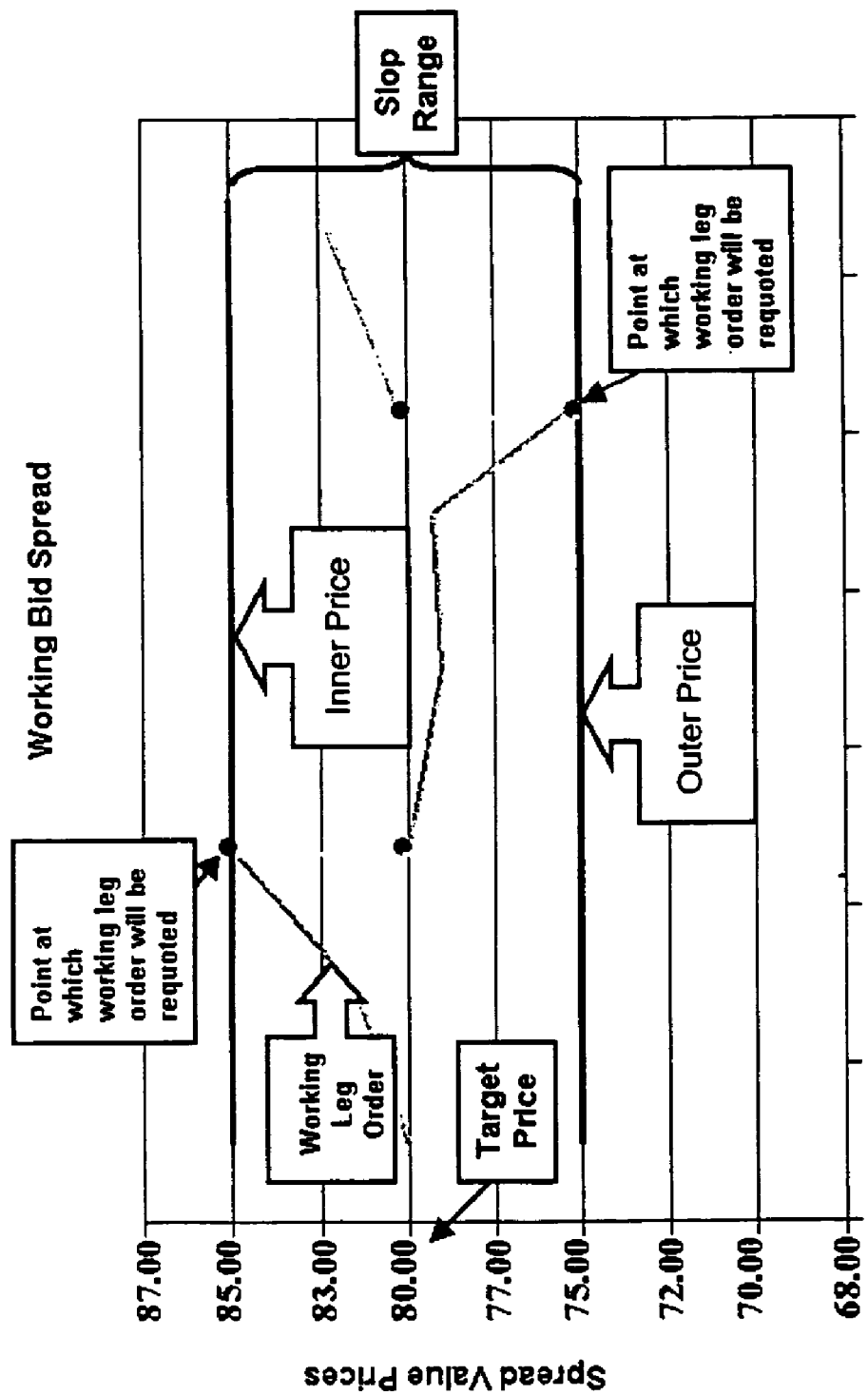
FIG. 15 shows an example of a boundary applied to the working bid spread order for the example of FIG. 13.

FIG. 15 shows a graph illustrating the working bid spread offer for this example. The target price is 80.00 and the slop range for the bid is between the prices of 75.00 and 85.00. Only when the working spread crosses either the outer price designation or the inner price designation, will the working orders be re-priced. Again, an order might not be filled at the original order price of 80.00, but at a price within the slop range of 75.00-85.00.

2. EXAMPLE 2

Re-Pricing

In yet another example, assume that a trader is trying to buy a spread at a price of 700 with an inside slop of 20 and an outside slop of 50. Thus, if the working spread price remains within a range of 650-720, the auto spreader may not re-price the working orders in either of the two spread legs. Moreover, this also means that the trade may be filled anywhere between 650-720, even though the spread order bid is at 700. Similarly, if the trader were trying to sell the spread at 700 with the same slop values, the acceptable fill range is between 680-750. The relevant spread parameters might include for leg A: spread ratio=1, multiplier=10, active quoting on; for leg B: spread ratio=−1, multiplier =−10, and active quoting is turned off.

Also, for the purposes of this example it is assumed that the trader has chosen to use inside market prices as the basis for quoting.

For this example, the trader wants to buy the spread at 700, assuming that the market is currently:

|        | Bid  | Offer |
|--------|------|-------|
| Leg A: | 1000 | 1005  |
| Leg B: | 900  | 920   |

Knowing that the trader would have to sell leg B at 900, the auto spreader calculates where to put the buy in for leg A to achieve a spread price of 700 by using either EQN 1 or EQN 2:

$$(10*X)-(10*900)=700$$

$$X=970$$

Therefore, the spreader places a bid in leg A for 970. Now, assume the slop settings are an inside slop of 20 and an outside slop of 50.

In this embodiment, because the trader is buying the spread, the inside slop applies to spread prices above the target price, and the outside slop applies to spread prices below the target price. If the trader were selling the spread, the opposite would be true. So, in this particular case, with these slop settings (i.e., inside slop=20, outside slop=50), the trader is trying to buy the spread at 700, but in the interest of avoiding constant quoting the trader is willing bid the spread in a range between 650 and 720. Since the trader is only actively quoting leg A, the only thing that might cause the order in leg A to move, is a change in the buy price for leg B (e.g., because the trader would like to sell leg B).

Now, assume that the market in B moves to 899 in leg B, 920 in leg A. Thus, if our working buy order in leg A were to hit at 970, the order in leg B would sell at 899 and the spread price would be:

$$(10*970)-(10*899)=710$$

The spread price of 710 is within the acceptable range of spread prices (i.e., 650-720) so the automatic spreader would not move the resting order in leg A at 970. Next, assume that the market in leg B drops to 896 in leg B, 919 in leg A. If the working buy order in leg A were hit at 970, the order in leg B would sell at 896 which implies:

$$(10*970)-(10*896)=740$$

This price (i.e., 740) is now outside of the acceptable price range established by the slop so the quote in leg A is moved. The automatic spreader would then calculate the new price for leg A based on the spread order price of 700 and a bid price in leg B of 896:

$$(10*X)-(10*896)=700$$

$$X=966$$

The automatic spreader changes the price of the bid order on leg A to 966. Now, assume that the bid in B moves back up to 900. If the buy order at 966 in leg A is filled and leg B would sell at 900. That gives a spread price of:

$$(10*966)-(10*900)=660$$

The spread price of 660 is within the acceptable range of 650-720, so the quote in leg A does not need updating. However, suppose that the bid in leg B continues up to 903. If the buy order at 966 in leg A is filled and sell leg B at 903, it would give us a spread price of:

$$(10*966)-(10*903)=630$$

Since, the spread price of 630 is outside the acceptable range of 650-720, the buy order in leg A would be updated, like before:

$$(10*X)-(10*903)=700; X=973$$

Thus, the working order in A is moved up to 973.

In the preferred embodiment, a trader can choose the particular manner in which the automatic spreader re-prices orders. For example, preferably the trader can choose to cause the automatic spreader to delete old orders and enter new orders or the trader can choose to have the automatic spreader use cancel/replace orders.

K. After an Order is Filled

Once a leg is filled, an "offset order" is preferably sent to fill the other leg(s) at either the market price or as a limit order with pre-defined "pay-up ticks," depending on the configuration of the spread as set by the user. A market order is a bid or ask order that is executed at the best price currently available in the market. In this embodiment, the best prices are those prices nearest to the inside market, where the inside market is the highest bid price and the lowest ask price for the tradeable object being traded for which there is quantity in the market. A limit order is executed at a specific price as dictated by the trader, regardless of whether it is the best price and/or regardless of whether there is sufficient quantity available for an immediate fill.

Preferably, the user may configure the automatic spreader 214 to use either of these two offset techniques, but alternatively, other offset techniques known in the art of trading may be implemented. Referring to FIG. 6, the value entered in the 'Offset with' field 624 may be used to determine whether quantities are entered as market orders or limit orders. If the 'Offset with' field 624 is set to 'market orders', then quantities will be entered into the market as market orders. If the field 624 is set to 'limit orders', then quantities will be entered as limit orders based on the value in the 'Payup Ticks' field 626. The limit orders can be based on any price level, either pre-set or customizable by the user. In the preferred embodiment, the limit orders are based on a price that will achieve the desired spread. Alternatively, the limit orders are based on the inside market (either the best offer in the case of a bid or the best bid in the case of an offer).

In this embodiment, the 'payup tick' value in field 626 represents the number of ticks (a tick is the minimum change in a price value that is set by the exchange for a tradeable object) that a trader is willing to pay beyond the basis of the limit price to complete a spread. To establish the price of the limit order, the payup tick value is added to the basis for a buy order and subtracted from the basis for a sell order. This allows the trader to set a level of tolerance with respect to the filling of an additional leg. In the preferred embodiment, this tolerance is defined by the user specifying a number of ticks but the invention is not limited to this particular technique. The use of pay-up ticks is further illustrated in the example below.

1. EXAMPLE 1

Quoting One or Two Legs with Offset Based on Market Orders

For example, when quoting one leg of a two-legged spread, after the working order is filled in the quoted leg, the automatic spreader will preferably send an offset market order to fill the other leg. If the automatic spreader is quoting both legs of a two-legged spread, after one of the working orders in one of the legs is filled, the automatic spreader preferably sends an offset market order to the other leg and then attempts to delete the working order that was being quoted in the other leg. If some or all of that working order gets filled before it can be deleted, in the preferred embodiment, the automatic spreader sends a corresponding offset market order to the other leg. This situation is called a double fill scenario. Alternatively, the automatic spreader can be set to first delete the working order being quoted in the other leg before sending the offset market order. The invention is not limited to the specific technique used.

When a partial quantity is filled in one of these legs, the spread ratio settings are preferably used to determine the quantity of the order that is sent into the second leg's market. For example, suppose a trader is working a 10-by-30-spread order and two of the 10 working quantity are filled on the first leg (20% of the working quantity). An equal percentage (20%) of the offset quantity may be sent into the market for the second leg. For the above example, a quantity of six (20% of 30) would be sent into the second leg's market, and the quantity of the spread would be adjusted based on the partially filled quantity. If the quantity (or spread units) are not whole numbers, the automatic spreader can round up/down or truncate, depending on how it is programmed.

2. EXAMPLE 2

Pay-Up Ticks

Figure 16:
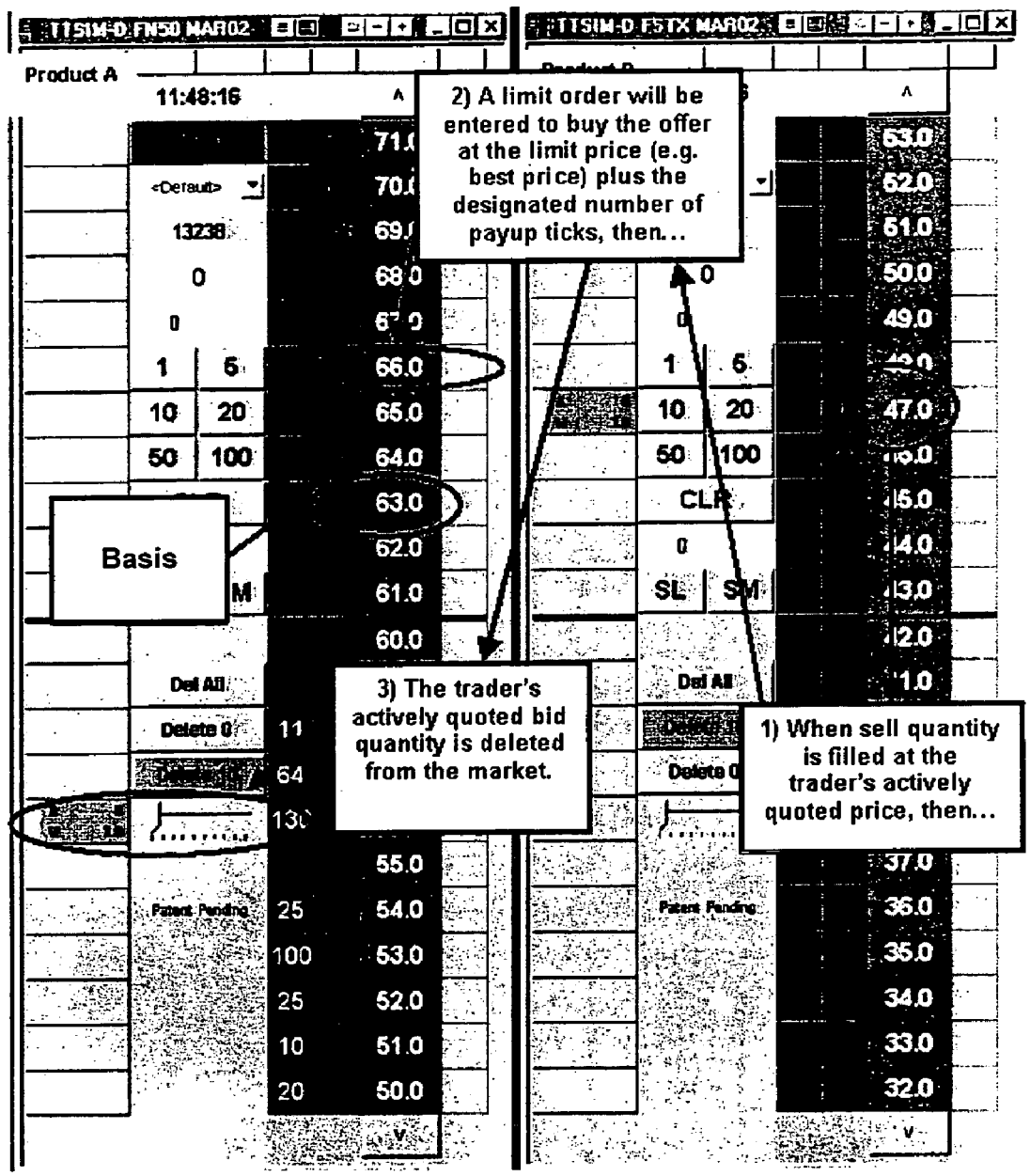
FIG. 16 illustrates the submission of an offset order using payup ticks.

Referring to FIG. 16, assume that a trader is working a spread for products A and B, sells the actively quoted quantity for Product B and consequently now wants to buy in product A in order to complete the spread. Assume that the desired spread value can be achieved by buying product A and a price of 63. Therefore, in the preferred embodiment, the price of 63 is the basis for calculating the limit order. Also, assume that the 'payup tick' field for that leg contains a value of three. As such, a limit order may be entered at a price of 66.0, which is the equivalent to the basis plus the three payup ticks. If there is sufficient quantity available to complete the spread at a bid price of 66.0 or less, that quantity might be filled immediately. If no such quantity is available, the limit order might not immediately be filled, but may instead remain entered at the price of 66.0 until sufficient quantity becomes available. In addition, if the trader sets the 'payup tick' value to three and a limit order is entered at a price that is three ticks from the basis, but quantity is available at a price better than where his limit order was entered, he might get filled at that better price. The payup tick feature of the preferred embodiment thereby puts a limit (the extent of which is defined by the payup ticks) on how far away from the basis the trader is willing to allow an offset order to be filled. On the other hand, by enabling the feature a trader is risking that he will not be filled at all on a leg of the spread.

III. Additional Embodiments

A. Using a Visual Indicator to Identify Spread Orders

In a preferred embodiment, a visual indicator is used to identify a spread window and the spread's associated orders from other spreads and/or orders. In this embodiment, the visual indicator is a color used to identify or distinguish a spread and its corresponding orders from other spreads and/or orders. Referring to FIG. 6, the leg color ID 612 allows a user to select the color for the spread. For example, according this embodiment, a green visual indicator is used (text may be used to indicate color in the figures). In this example, a trader can visually determine the spread and the corresponding orders in legs 1 and 2 by matching the green color shown in FIG. 7. Then, to trade a second spread, which is separate from the first "green" spread, another color may be chosen that is different from green to distinguish the second spread from the first spread. This may be repeated for as many spreads and orders as are traded.

In an alternate embodiment, other indicators such as text may be used to identify a spread window and the spread's associated orders from other spreads and/or orders. Moreover, a combination of indicators such as text and color may be used. Such indicators preferably allow a trader to easily and quickly distinguish spread orders from other spread orders, as well as orders entered directly into the underlying legs.

B. Multiple Spread Windows

In this embodiment, multiple spreader windows may be open, depending on the application. Each spreader window may be independent from each other, even if they share common legs.

C. Ability to Trade in Legs

In this embodiment, a user may also trade in the legs. That is, orders may be entered directly into one or more of the legs as trades that are independent from the spread trade.

Using a visual indicator, or lack thereof, leg trades may be distinguished from working orders for a spread trade.

D. Ability to Move/Cancel Spread Quotes in Legs

In this embodiment, a user can move and/or cancel orders in any of the legs at any time before filling. For example, in FIG. 10, the spread window 1000 has an order entered at a price of 0.860. To delete the order 1032, the "Delete 5" icon 1040 can be pressed, which will delete only the order entered to buy 5 of the spread at 0.860. Alternative techniques can be used to delete the working orders, such as left clicking directly on the working order. Other orders in column 1006 (not shown) may also be deleted, along with the order 1032, by pressing the "Del All" icon 1042. Moreover, the order 1032 can be moved to a different price, by dragging the order to another cell in column 1006.

The same is true for orders entered in the legs. Using the delete icons shown in the legs, a user can delete some or all of the orders for that particular tradeable object. In addition, orders in the legs can be moved in a similar fashion as moving spread orders. Although, moving orders in the legs that are related to a spread may change the target or implied price of the spread.

IV. Conclusion

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A computer-based method for estimating a spread value between at least a first tradeable object and a second tradeable object, the method comprising:

receiving by a computing device a definition for a spread, wherein the spread is between a first tradeable object and a second tradeable object, the definition determining whether the first tradeable object is to be bought or sold and whether the second tradeable object is to be bought or sold to complete the spread;

receiving at the computing device a first market data from an electronic exchange, the first market data comprising a highest bid price and a lowest ask price currently available for the first tradeable object and a last traded price for the first tradeable object;

receiving at the computing device a second market data from an electronic exchange, the second market data comprising a highest bid price and a lowest ask price currently available for the second tradeable object and a last traded price for the second tradeable object;

detecting at the computing device a change in the first market data;

electronically estimating at the computing device the spread value responsive to the change in the first market data using the definition for the spread;

wherein the spread value is based on a highest bid price for the second tradeable object when the second tradeable object is to be sold or the spread value is based on a lowest offer price for the second tradeable object when the second tradeable object is to be bought; and displaying the spread value on a screen of an electronic terminal in relation to an axis of price levels.

2. The computer-based method of claim 1 further comprising detecting a change in the first market data by detecting a subsequent last traded price indicating a new trade has occurred for the first tradeable object.

3. The computer-based method of claim 2 further comprising characterizing a last trade that has occurred at the subsequent last traded price as a trade to buy the first tradeable object when the subsequent last traded price is below the highest bid price for the first tradeable object.

4. The computer-based method of claim 3 further comprising estimating the spread value according to the spread definition when the first tradeable object is to be bought.

5. The computer-based method of claim 3 further comprising estimating the spread value according to an inverse of the spread definition when the first tradeable object is to be sold.

6. The computer-based method of claim 2 further comprising characterizing a last trade that has occurred at the subsequent last traded price as a trade to sell the first tradeable object when the subsequent last traded price is above the lowest ask price for the first tradeable object.

7. The computer-based method of claim 6 further comprising estimating the spread value according to the spread definition when the first tradeable object is to be sold.

8. The computer-based method of claim 6 further comprising estimating the spread value according to an inverse of the spread definition when the first tradeable object is to be bought.

9. The computer-based method of claim 1 further comprising detecting a change in the first market data by detecting a new highest bid price, and characterizing the change as a result of buying the first tradeable object.

10. The computer-based method of claim 9 further comprising estimating the spread value according to the spread definition when the first tradeable object is to be bought.

11. The computer-based method of claim 9 further comprising estimating the spread value according to an inverse of the spread definition when the first tradeable object is to be sold.

12. The computer-based method of claim 1 further comprising detecting a change in the first market data by detecting a new lowest ask price, and characterizing the change as a result of selling the first tradeable object.

13. The computer-based method of claim 12 further comprising estimating the spread value according to the spread definition when the first tradeable object is to be sold.

14. The computer-based method of claim 12 further comprising estimating the spread value according to an inverse of the spread definition when the first tradeable object is to be bought.

15. The computer-based method of claim 1 further comprising estimating a quantity associated with the spread value.

16. The computer-based method of claim 1 wherein the spread value is further based on a weighted average of a plurality of highest bid prices that it would take to sell the second tradeable object or based on a weighted average of a plurality of lowest offer prices that it would take to buy the second tradeable object.

* * * * *

UNITED STATES PATENT AND TRADEMARK OFFICE
CERTIFICATE OF CORRECTION

| | | |
|---|---|---|
| PATENT NO. | : 7,542,940 B2 | |
| APPLICATION NO. | : 11/417870 | |
| DATED | : June 2, 2009 | |
| INVENTOR(S) | : Burns et al. | |

It is certified that error appears in the above-identified patent and that said Letters Patent is hereby corrected as shown below:

In the Drawings

The drawing sheet 10 of 17 consisting of Fig(s) 10 should be deleted and substitute therefore the attached drawing sheet 10 of 17 consisting of Fig(s) 10.

Signed and Sealed this
Nineteenth Day of July, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,542,940 B2 | |
| APPLICATION NO. | : 11/417870 | |
| DATED | : June 2, 2009 | |
| INVENTOR(S) | : Michael J. Burns et al. | |

It is certified that error appears in the above-identified patent and that said Letters Patent is hereby corrected as shown below:

In the Claims:

Claim 1, column 31, line 12: please delete "at the computing device" and insert --by the computing device--.

Claim 1, column 31, line 17: please delete "at the computing device" and insert --by the computing device--.

Claim 1, column 31, line 22: please delete "at the computing device" and insert --by the computing device--.

Claim 1, column 31, line 24: please delete "at the computing device" and insert --by the computing device--.

Signed and Sealed this
Sixteenth Day of April, 2013

Teresa Stanek Rea
*Acting Director of the United States Patent and Trademark Office*